US011837899B2

(12) United States Patent
Roberts et al.

(10) Patent No.: US 11,837,899 B2
(45) Date of Patent: *Dec. 5, 2023

(54) STORAGE AND CHARGING STATION FOR STORING AND CHARGING A PLURALITY OF MOBILE ELECTRONIC DEVICES, SYSTEM INCLUDING THE STATION, AND METHOD OF COMMUNICATION AMONG THE SAME

(71) Applicant: Nathan R. Roberts, Columbus, WI (US)

(72) Inventors: Nathan R. Roberts, Columbus, WI (US); Morgan Lowery, DeForest, WI (US); Austin Borkowski, Madison, WI (US)

(73) Assignee: Nathan R. Roberts, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,829

(22) Filed: Sep. 22, 2022

(65) Prior Publication Data
US 2023/0026304 A1    Jan. 26, 2023

Related U.S. Application Data

(63) Continuation of application No. 16/987,725, filed on Aug. 7, 2020, now Pat. No. 11,489,353, which is a continuation-in-part of application No. 16/986,604, filed on Aug. 6, 2020, now Pat. No. 11,462,925.

(60) Provisional application No. 62/932,316, filed on Nov. 7, 2019, provisional application No. 62/883,980, filed on Aug. 7, 2019.

(51) Int. Cl.
H02J 7/00    (2006.01)

(52) U.S. Cl.
CPC ......... *H02J 7/0045* (2013.01); *H02J 7/0013* (2013.01); *H02J 7/00032* (2020.01); *H02J 7/0047* (2013.01)

(58) Field of Classification Search
CPC .................................................... H02J 7/0045
USPC ........................................................ 320/115
See application file for complete search history.

(56) References Cited

U.S. PATENT DOCUMENTS

| 9,323,288 | B2 | 4/2016 | Dresser, III |
| 9,501,380 | B2 | 11/2016 | Johnson et al. |
| 9,680,317 | B2 | 6/2017 | Roberts |
| 9,817,749 | B2 | 11/2017 | D'Abreu et al. |
| 10,050,457 | B2 | 8/2018 | Todasco |

(Continued)

*Primary Examiner* — Yalkew Fantu
(74) *Attorney, Agent, or Firm* — Boardman & Clark LLP

(57) ABSTRACT

A storage and charging station for storing and charging a plurality of mobile electronic devices communicable with a remote electronic device. The station comprises a storage assembly and an electrical system coupled to the storage assembly. The storage assembly comprises a frame and a plurality of storage bays supported by the frame. The plurality of storage bays is to receive the plurality of mobile electronic devices. The electrical system comprises a power component, a communication component, a logic component, a memory component, and a plurality of ports electrically coupled to the power component and the communication component. When a first mobile electronic device connects with a first port, the power component powers the first mobile electronic device via the first port, and the station communicates with the remote electronic device via the first port and the first mobile electronic device.

18 Claims, 20 Drawing Sheets

(56) References Cited

U.S. PATENT DOCUMENTS

| | | | |
|---|---|---|---|
| 10,076,050 B2 | 9/2018 | Roberts | |
| 10,084,327 B2 | 9/2018 | Roberts | |
| 10,312,700 B2 | 6/2019 | Roberts | |
| 10,412,853 B2 | 9/2019 | Dombrowski et al. | |
| 10,638,630 B2 | 4/2020 | Roberts | |
| 11,489,353 B2 * | 11/2022 | Roberts | H02J 7/0045 |
| 2015/0220416 A1 | 8/2015 | Johnson et al. | |
| 2015/0380964 A1 * | 12/2015 | Tischer | H02J 7/0013 |
| | | | 320/137 |
| 2016/0056645 A1 * | 2/2016 | Henman | G01V 1/247 |
| | | | 320/112 |
| 2016/0268822 A1 * | 9/2016 | Toya | H02J 7/0068 |
| 2016/0276852 A1 * | 9/2016 | Roberts | H05K 7/14 |
| 2017/0039122 A1 | 2/2017 | Johnson et al. | |
| 2017/0047751 A1 | 2/2017 | Fernandes | |
| 2018/0351375 A1 | 12/2018 | Baldasare et al. | |
| 2019/0027944 A1 | 1/2019 | Grzybowski et al. | |

* cited by examiner

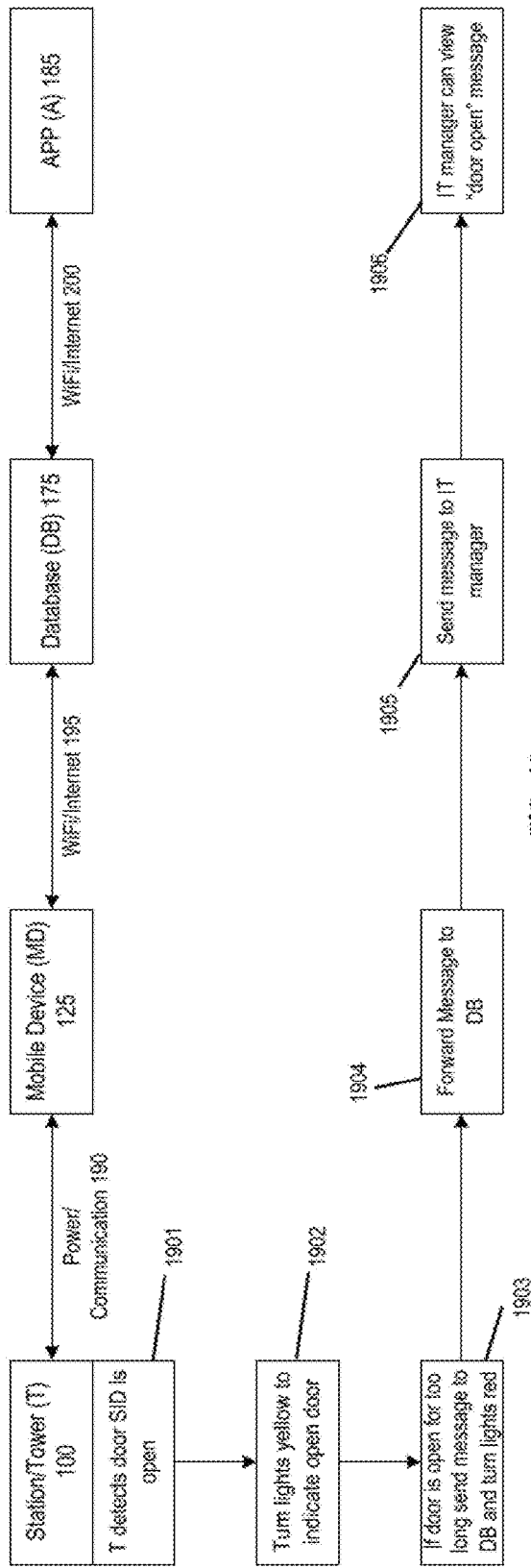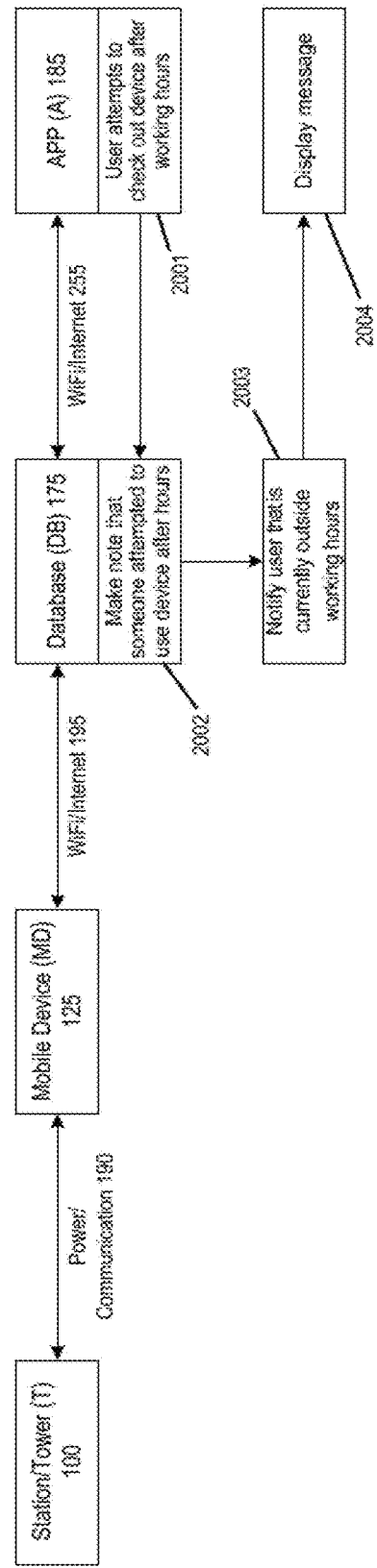

STORAGE AND CHARGING STATION FOR STORING AND CHARGING A PLURALITY OF MOBILE ELECTRONIC DEVICES, SYSTEM INCLUDING THE STATION, AND METHOD OF COMMUNICATION AMONG THE SAME

RELATED APPLICATIONS

This application is a continuation of U.S. patent application Ser. No. 16/987,725, now U.S. Pat. No. 11,489,353, filed Aug. 7, 2020, which is a continuation-in-part of U.S. patent application Ser. No. 16/986,604, now U.S. Pat. No. 11,462,925, filed Aug. 6, 2020. U.S. patent application Ser. No. 16/987,725 also claims the benefit of U.S. patent application Ser. No. 62/883,980, filed on Aug. 7, 2019; and U.S. patent application Ser. No. 62/932,316, filed on Nov. 7, 2019. All of the above are incorporated herein by reference.

FIELD

This disclosure relates to storage and charging stations for mobile electronic devices and systems including the same. More specifically, the disclosure relates to methods of and systems for storing, inventorying, charging, deploying, tracking, and/or managing mobile electronic devices.

BACKGROUND

Mobile electronic devices have become common place in personal and professional endeavors, including educational and business settings. Mobile electronic devices may also be referred to as "mobile computer devices," "handheld electronic devices," and "handheld computer devices." Desktop computers initially paved the way for common personal and business use of computers for word processing, data entry, planning, general and technical information-transfer, business management, remote communication, self-education, and other uses. Improving mobile electronic devices, including laptop computers, tablets, and cell phones, rapidly increased individual electronics use within organizations, including educational and business organizations, which now may centrally purchase quantities of generally uniform selected mobile electronic devices for use by students, employees, or other users served by such organizations.

As the number of mobile electronic devices increases, storage, charging, and deployment becomes more difficult. Therefore, holders and stations for these devices are known, such as disclosed in U.S. Pat. No. 10,084,327 and its related patents and applications, which may be understood to provide background information for this disclosure. An improved solution is desired.

SUMMARY

Purchasing organizations may desire a certain amount of control of mobile electronic devices. The amount of control to assert may be dependent upon a number of factors considered by organizations, including, but not limited to, management of the mobile electronic devices, inventory of the mobile electronic devices, the type of user of mobile electronic devices, the number of potential users for each mobile electronic device, the environment in which the mobile electronic device is in use, the relationship between the user and purchasing organization, the number of mobile electronic devices in use, updating and maintenance of the mobile electronic devices, and/or minimizing risk of loss and/or replacement costs of the mobile electronic devices. Which factor(s) have the greatest weight dictating the necessary amount of control will be dependent upon the specific purchasing organization.

For example, in a school setting, a mobile electronic device may be assigned to a specific student. That student may pick up the mobile electronic device at a certain time during the school day, such as at the beginning of the school day, use it throughout the school day, and return the mobile electronic device at the end of the school day. In another example, in a school setting, a classroom of students may use a number of mobile electronic devices for a period of time during the day. As the students turn over in the classroom, such as by changing classes during the day, different students may use the number of mobile electronic devices. As such, a plurality of different students may use a single mobile electronic device during a day. In these examples, while utilizing the mobile electronic devices as an educational tool is an outstanding way for students to learn, it can lead to issues in maintaining the mobile electronic devices. For example, it may be difficult to inventory the devices during the day, charge, or recharge the devices, account for the return of all devices once students complete use of the devices, and/or efficiently deploy new software or associated updates.

Similar to a school setting, mobile electronic devices may be deployed for public use at libraries or other public access building. In this setting, the mobile electronic devices may be checked out to users for a period of time. Again, many of the same problems as would arise in an educational setting, such as the ability to inventory or account for the return of all devices, may arise at these public settings.

As another example, businesses or hospitals/medical service providers may deploy mobile electronic devices in association with business operations or providing medical services, respectively. For efficiency or operational gains to be realized by use of the mobile electronic devices, the mobile electronic devices must be operational and must be used. The inability of the business or medical service provider to control the mobile electronic devices can interrupt any efficiency or operational gains. For example, should an employee take a mobile electronic device from the premises and forget to return it, that employee will not be able to use the mobile electronic device during performance of his or her job. Similarly, if an employee fails to charge or fully recharge the battery of the mobile electronic device, the mobile electronic device can run out of power during an employee's workday, rendering the mobile electronic device useless. This and other situations not referenced can lead to inefficiencies and unnecessary risks of loss.

Accordingly, it may be advantageous to know where a mobile device is located. It may be advantageous to know what station holds a device and when the device is deployed. It may be advantageous to provide some feedback in the station regarding the status of the mobile device. It may be advantageous to provide mobile devices as a vending service across multiple locations.

Disclosed herein is a station and system with identification components addressing one or more of the above noted needs, among other needs. In addition, the disclosed station and system may allow for cost-effective, easy-to-use adoption of identification technology for ease of integration into a business, medical, vending, or school's existing workflow. The disclosed station and system may advantageously not require further connection of the station to a network, instead using existing components within a mobile device to allow for identification. As a non-limiting example, the disclosed station and system may allow for a charging and storage unit that transmits an identifier through the charging component to a mobile device for upload to the cloud. This may allow for modularity of the storage component, which may in various embodiments require no connection of the storage device to a local computing network.

Further, the station and system may have particular advantages to organizations having cloud-based computing. For example, when a mobile electronic device has low power, the user may deposit the low-power device into a charging and storage station and grab a new mobile electronic device, resuming the user's work with limited interruption. The system may then advantageously log the low power device as being provided into the station. The station may be associated with a location. Therefore, the device may be associated with a location by way of the station. In various embodiments, the station and system may further provide an indicator on the station, for example, showing battery charge status.

It should be understood that while particular systems are disclosed, the improved identification feature may be adapted to other storage and charging systems for multiple mobile electronic devices.

Disclosed is a charging and storage station having a power component, the power component further comprising a logic portion and an output. The output may comprise, in various implementations, a known peripheral standard, such as but not limited to, various USB protocol outputs. As a non-limiting example, the output may comprise a USB-C protocol having a cable for connection of the station to a device.

In various embodiments, the output may allow for transmission of logic from the logic portion through the output to the mobile electronic device. Therefore, a user may deposit a mobile electronic device into the station (for example, in a station shelf portion), and connect the mobile electronic device to the power component using the output. The logic may then supply an identifier to the mobile electronic device. The identifier may comprise, for example, a shelf portion identifier and a station identifier.

Connection to the mobile electronic device may allow for the station to likewise respond in some manner, such as using one or more lights or sounds. As a non-limiting example, the station shelf portion may have a light indicating whether a mobile electronic device is on a shelf. As another non-limiting example, the station shelf portion may comprise an indicator showing battery charge status of the mobile electronic device (for example, whether the device is charging).

Also disclosed is a storage and charging station for storing and charging a plurality of mobile electronic devices communicable with a remote electronic device. The station comprises a tower assembly and an electrical system coupled to the tower assembly. The tower assembly comprises a frame and a plurality of storage bays supported by the frame. The plurality of storage bays is to receive the plurality of mobile electronic devices. The plurality of storage bays includes a first storage bay to receive a first mobile electronic device of the plurality of mobile electronic devices. The electrical system comprises a power component to power the plurality of mobile electronic devices, a communication component to communicate with the plurality of mobile electronic devices, a logic component, a memory component, and a plurality of ports electrically coupled to the power component and the communication component. The plurality of ports includes a first port associated with the first storage bay. When the first mobile electronic device connects with the first port, the power component powers the first mobile electronic device via the first port, and the station communicates with the remote electronic device via the first port and the first mobile electronic device.

Also disclosed is a system for storing, inventorying, charging, deploying, tracking, and/or managing a plurality of mobile electronic devices. The system comprises the storage and charging station for storing and charging the plurality of mobile electronic devices, and a first mobile electronic device of the plurality of mobile electronic devices. The first mobile electronic device is disposed in a first storage bay of the plurality of storage bays and electrically coupled to a first port of the plurality of ports. When the first mobile electronic device connects with the first port, the power component powers the first mobile electronic device via the first port, and the storage and charging station communicates with the first mobile electronic device via the port. The system further comprises a remote electronic device communicable with the plurality of mobile electronic devices. When the first mobile electronic device connects with the first port, the remote electronic device communicates with the station via the first mobile electronic device. The remote electronic device can be a server and a database. The remote electronic can also be a hand-held electronic device having an application communicable with the server.

These and other advantages and features may be realized from the disclosure provided further herein.

BRIEF DESCRIPTION OF THE DRAWINGS

FIG. 19 is a flow diagram of a process for use with the system of FIG. 5 for indicating an improper door closure.

FIG. 20 is a flow diagram of a process for use with the system of FIG. 5 for time locking a shelf door.

Figure 1A:
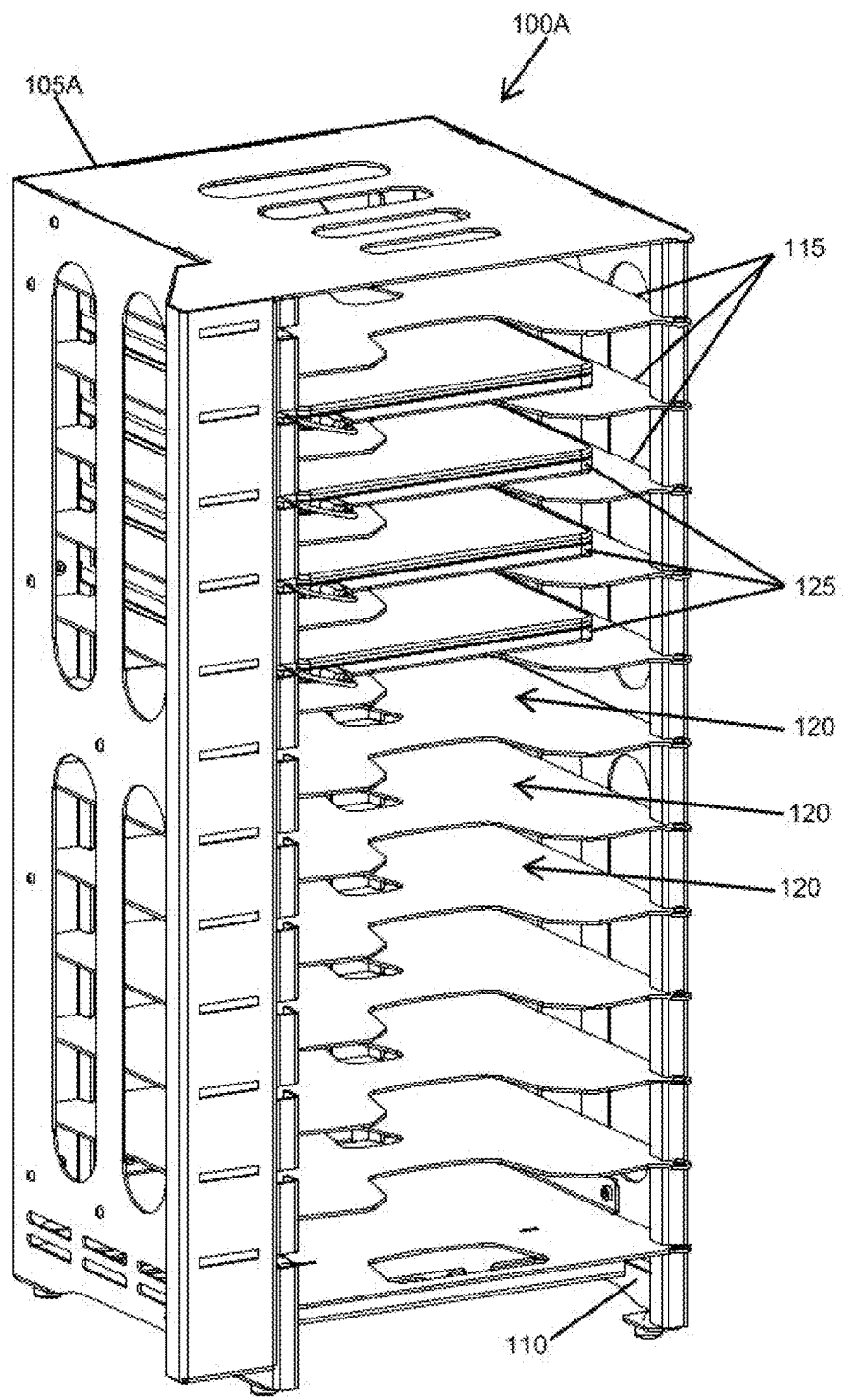
FIG. 1A is a perspective view of an open-concept storage and charging station system for mobile electronic devices.

It should be understood that the Drawings are not necessarily to scale. In certain instances, details that are not necessary to the understanding of the invention or render other details difficult to perceive may have been omitted. It should also be understood that the invention is not necessarily limited to the particular embodiments illustrated herein.

DETAILED DESCRIPTION

The invention illustrated in the Drawings and disclosed herein is generally directed to storage and charging stations for mobile electronic devices having an identification component. The disclosed apparatus, systems, and methods herein may be used for identifying a mobile electronic device and/or storage and charging of the mobile electronic devices. The disclosed apparatus, systems, and methods herein may also be used for storing, inventorying, charging, deploying, tracking, and/or managing mobile electronic devices.

While certain Figures illustrate a mobile electronic device as a laptop computer, it should be appreciated that a mobile electronic device may be other suitable mobile electronic devices requiring storage and/or battery charging. For example, a mobile electronic device may include, but is not limited to, a laptop computer, netbook computer, notebook computer, Google Chromebook™ computer, tablet device (such as an Apple iPad®, Samsung Galaxy®, or Microsoft Surface®, or any similar known or future developed tablet), mobile smartphone, two-way radio, body-worn safety camera, mobile action camera, mobile security device, or other known or future developed mobile electronic devices. As used herein, the term "mobile" electronic device refers to an electronic device that is readily movable or is readily capable of being moved. A "mobile" electronic device may also be referred to herein as a "handheld" electronic device. As used herein, the term "stationary" electronic device refers to an electronic device that is predominately immobile. For example, a person of ordinary skill in the art would view a "desktop" computer as a "stationary" electronic device since it is predominately immobile even though it may be portable. As another example, a person of ordinary skill in the art would view a "laptop" computer as a "mobile" electronic device since it is readily movable even though it can be stationed.

Figure 1B:
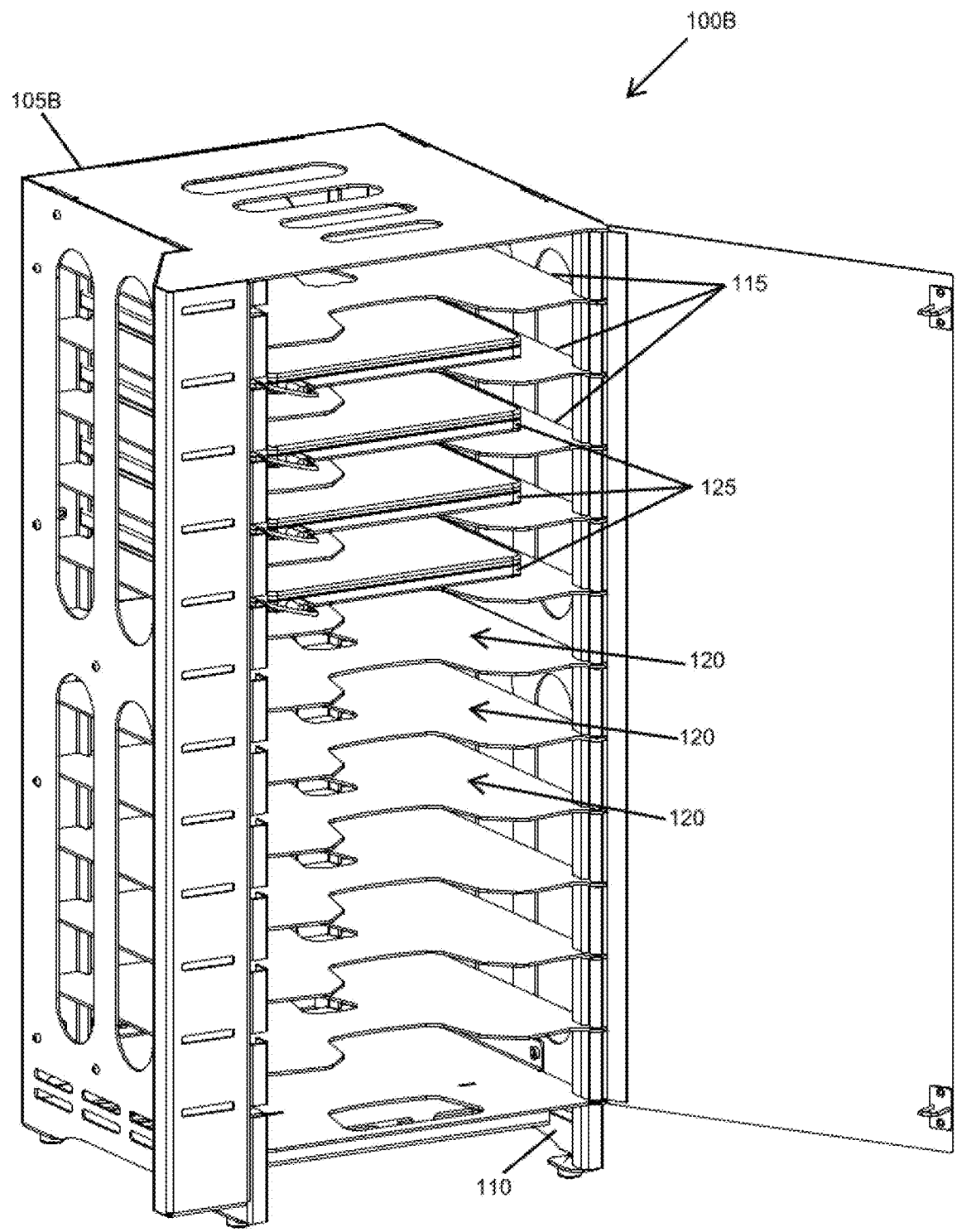
FIG. 1B is a perspective view of a single-door storage and charging station system for mobile electronic devices.
Figure 1C:
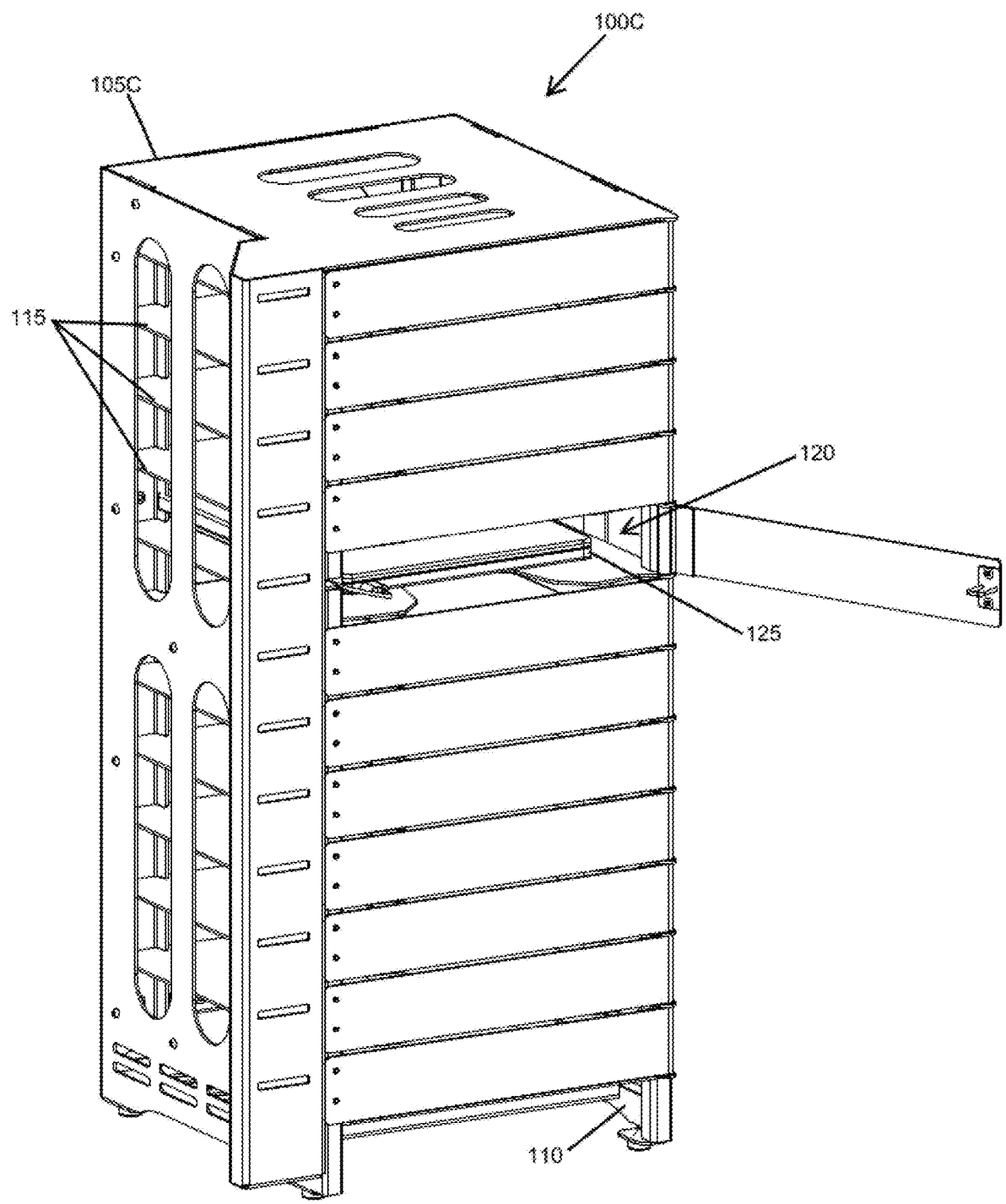
FIG. 1C is a perspective view of an individual-doors storage and charging station system for mobile electronic devices.
Figure 2:
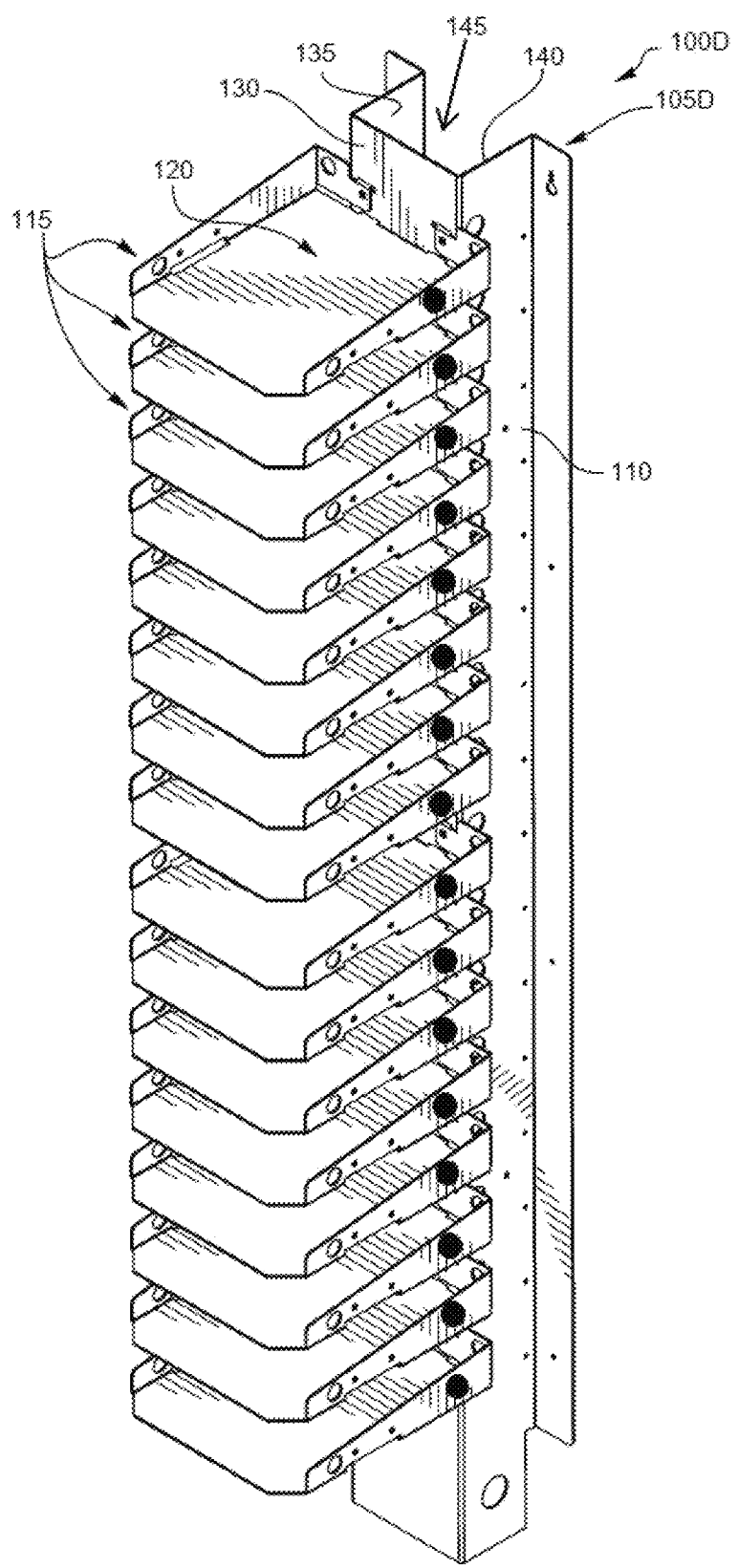
FIG. 2 is an isometric view of a mountable storage and charging station for mobile electronic devices.

Referring now to the Figures, FIGS. 1A, 1B, and 1C illustrate examples of storage and charging stations 100A-C. FIG. 2 illustrates an example of a storage and charging station 100D capable of being mounted. Unless specifically identified by A, B, C, or D when referring to a storage and charging station 100, then the description is referring to any one of storage and charging stations 100A-D. The storage and charging stations 100A-D include a respective tower assembly 105. The tower assembly 105A is referred to as an "open-concept" tower cage assembly. The tower assembly 105B is referred to as a "single-door" tower cage assembly. The tower assembly 105C is referred to as a "multiple-door" tower cage assembly, and specifically tower assembly 105C is an "individual-doors" tower cage assembly. The tower assembly 105D is referred to as an "open-concept" tower assembly.

With reference to FIGs. 1A-C and 2, the tower assembly 105 includes a frame (or support) 110. A plurality of shelf portions (or shelves) 115 may be coupled to or supported by the frame 110. Each of the plurality of shelf portions 115 defines a storage bay 120 for receiving a mobile electronic device 125 (a plurality of mobile electronic devices 125 are shown in FIGS. 1A-C and no mobile electronic devices 125 are shown in FIG. 2). The plurality of shelf portions 115 may be provided in a linear, spaced, or stacked configuration on frame 110. This configuration advantageously conserves space and minimizes the footprint of the storage and charging station 100. While the storage and charging stations 100 illustrate an array of sixteen shelf portions 115 coupled thereto, it should be appreciated in one or more examples that the storage and charging stations 100 may be any suitable size, length, or configuration to support any desired number of shelf portions 115, which may be more than sixteen or less than sixteen. Likewise, the configuration and number of shelf portions 115 may be understood to be modifiable to suit functional and storage goals. Similarly, other tower assemblies, for example as disclosed in U.S. patent application Ser. No. 16/7986,604, which is incorporated hereby reference, may advantageously be used with apparatus, systems, and processes described herein.

Before continuing, it should also be understood that the storage and charging station can take many other forms than as shown in FIGS. 1A-C, FIG. 2, and U.S. patent application Ser. No. 16/7986,604. For example, the station can take the form of one or more lockers with each locker having one or more charging cords or ports. As another example, the station can take the form of an open holder that has one or more vertical slots, with each slot having a charging cord or port. As will become more apparent below, the physical construction or arrangement of the station is not as limiting of a feature for the invention.

Figure 3:
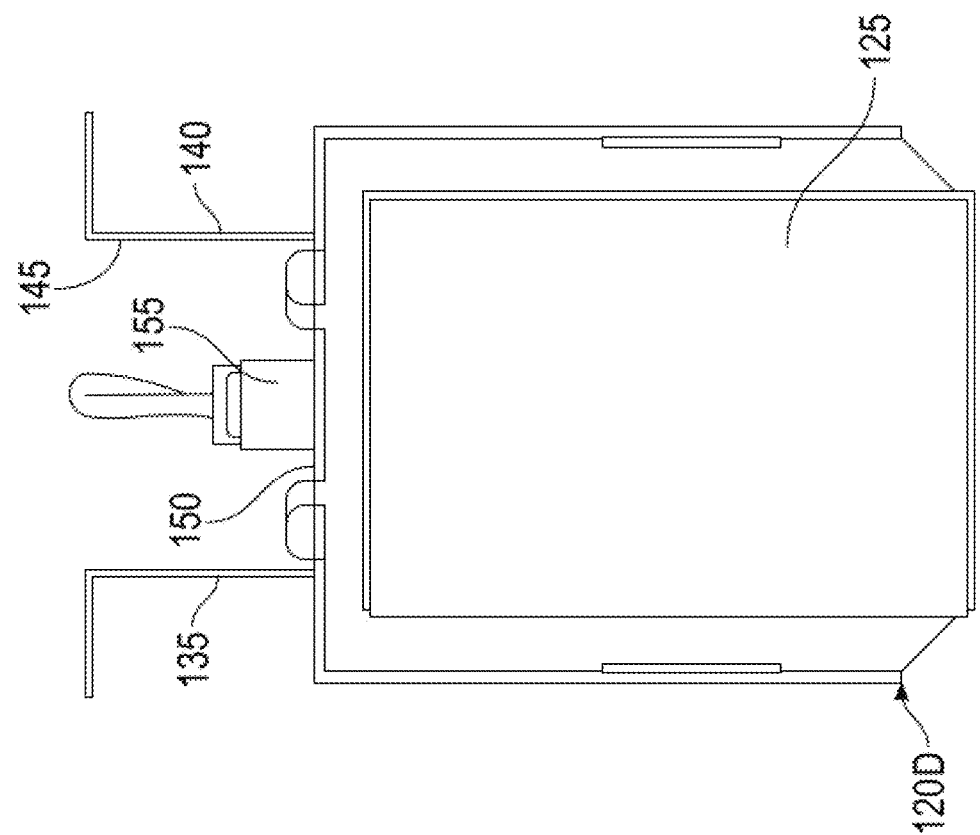
FIG. 3 is a top down plan view of the tower of FIG. 2 illustrating a power supply mounted in a channel.

Referring now to FIGS. 2 and 3, frame 110 includes a first support portion 130, a second support portion 135, and a third support portion 140. Second and third support portions 135 and 140 are provided at an angle to first support portion 130 to define a cable management channel 145. The first, second, and third support portions 13-140 may consist of a single unitary sheet bent or formed into a single channel shape. As such, cable management channel 145 is defined by first, second, and third portions 130, 135, and 140. Cable management channel 145 is provided on the side of first support portion 130 opposite the plurality of shelf portions 115. As illustrated in FIGS. 2 and 3, second and third support portions 135 and 140 may be provided parallel to one another, and further provided approximately perpendicular to first support portions 130. For FIGS. 1A-1C, the frames 110 includes cable management channels 145.

Figure 4:
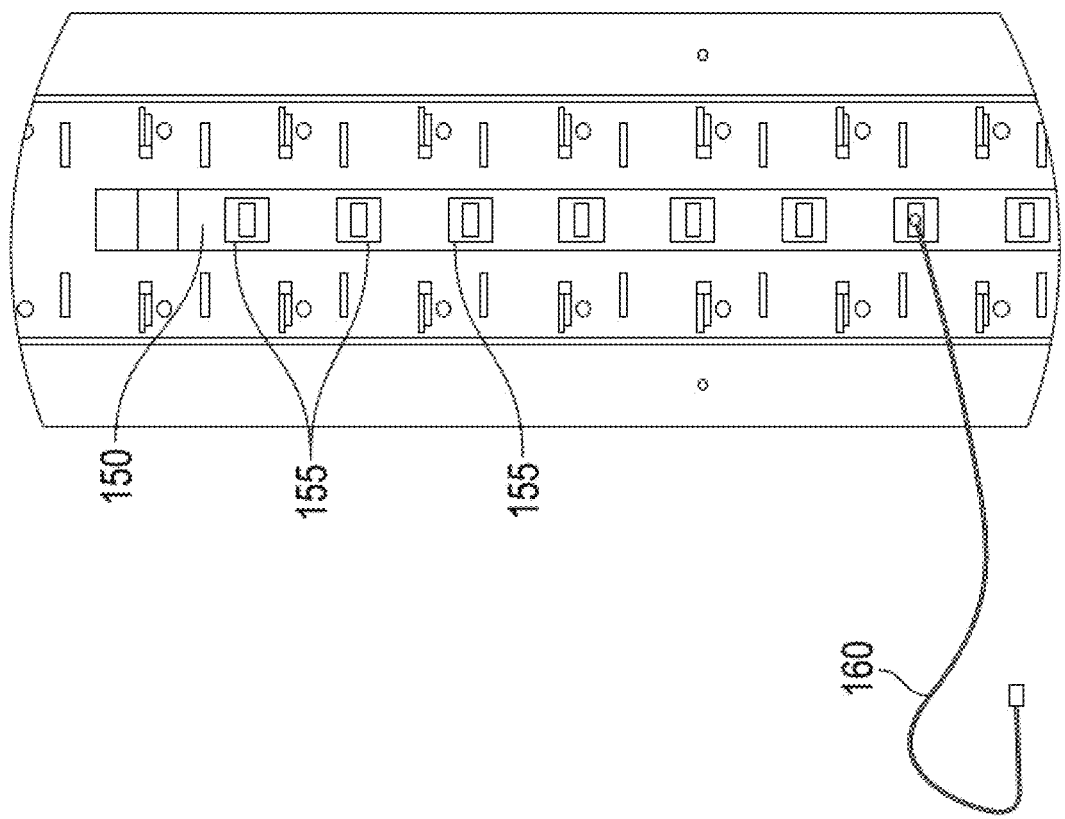
FIG. 4 is a partial rear view of the tower of FIG. 2.

Portions 150 of a power component can be seen in FIGS. 3 and 4. The portions 150 are provided in part in the cable management channel 145. Referring to FIGS. 3 and 4, the power component includes a plurality of power ports (ports 155 are labelled), which, for example, may be connected by conductors (cable 160 is shown) to mobile electronic devices (mobile device 125D is shown). The conductors, including cable 160, can be referred to as a direct connection (discussed more below). Each port 155 and direct connection may be correlated with a storage bay (storage bay 120D is shown). The power component may be comprised of a suitable standard transmission type, such as, but not limited to, USB, USB-C, lightning, and other known transmission types that may transmit both power and data. As shown, port 155 (which may transmit both data and power) may be a USB-C port or a thunderbolt 3 port. In various constructions, cable 160 may be a USB-C cable (though other existing and yet to be available data and power transmission protocols such as, but not limited to, USB, USB $1.x$-$4.x$, USB mini, USB micro, USB types A and B, lightning, may be utilized). In alterative to the cable 160, it is envisioned that the shelf portion can include a wireless charger embedded in the shelf portion 115. The wireless charger can promote wireless communication with a mobile electronic device 125 and may still be referred to as a direct connection. It is also envisioned, in an implementation, that one end of the cable 160 is hard-wired to the power component, with the other end of the cable acting as the port.

Figure 5:
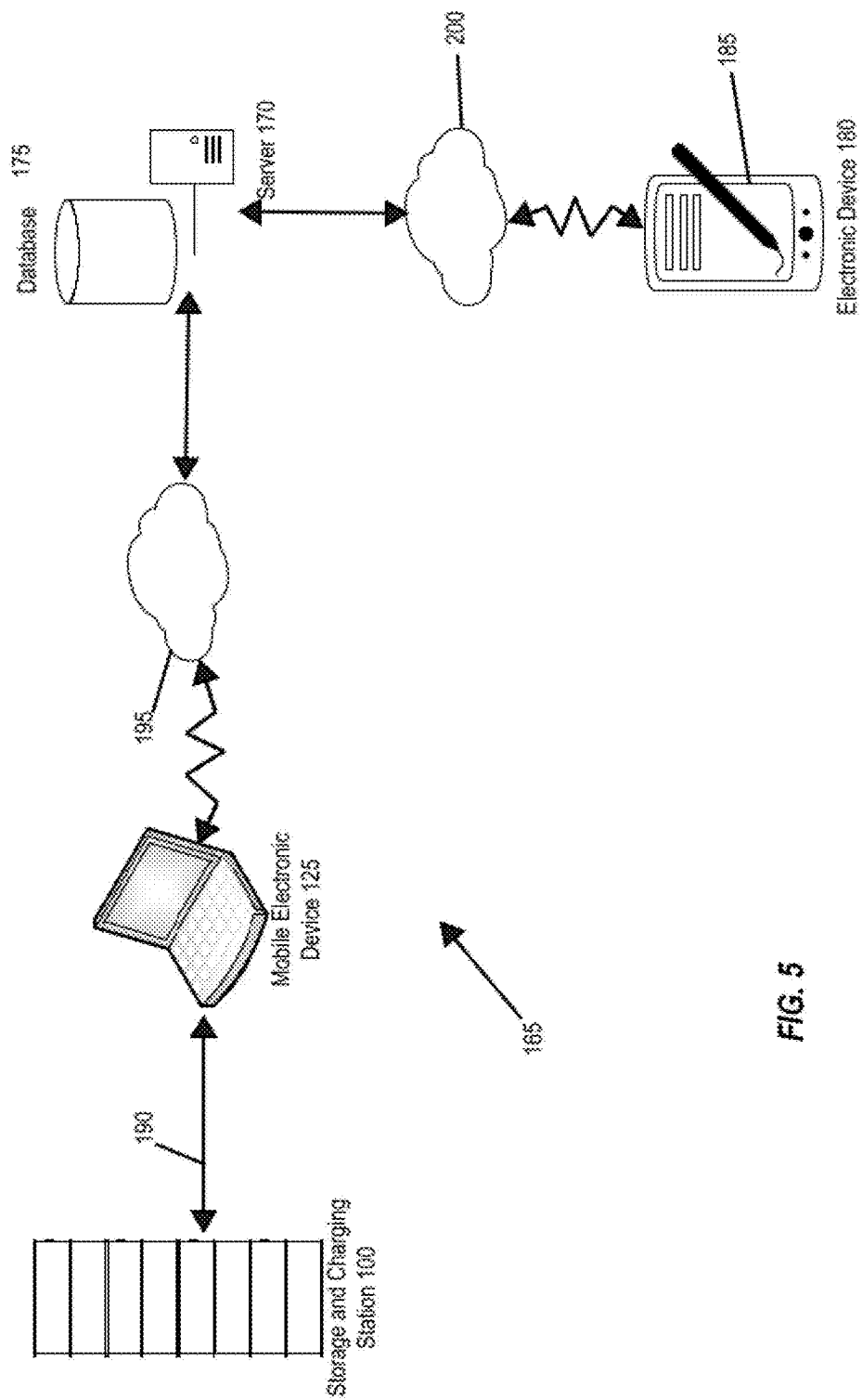
FIG. 5 is a block diagram representing a system for storing, inventorying, charging, deploying, tracking, and managing mobile electronic devices.

FIG. 5 represents a system for storing, inventorying, charging, deploying, tracking, and managing mobile electronic devices (for simplicity, the system 165). The system 165 includes a storage and charging station 100, a mobile electronic device 125, a server 170 including a database 175, and an electronic device 180 executing an application (or app) 185. The server 170, database 175, and electronic device 180 can be referred to as a remote electronic device. While FIG. 5 shows only a single device for each component, it should be understood that the system 165 can comprise multiples of each device. For example, the mobile electronic device 125 is one of a plurality of the mobile electronic devices that can be stored among a plurality of storage and charging stations. As another example, the electronic device 180 can be one of a plurality of electronic devices that execute one of a plurality of apps. Yet another example, the server 170 and the database 175 can be one of a plurality of databases being implemented by a plurality of servers, which may be generally referred to as cloud computing.

Referring again to the construction shown in FIG. 5, the mobile electronic device 125 is directly coupled to the storage and charging station 100. The direct connection 190 can be a wired and/or wireless connection as discussed above. The direct connection 190 provides power and data communication. The mobile electronic device 125 couples or communicates with the server 170 and the database 175, via, at least, one or more wireless connections, such as Wi-Fi or the Internet (collectively wireless connection 195). The server 170 couples or communicates with the electronic device 180, and more specifically the app 185, via Wi-Fi and/or the Internet (collectively connection 200). Connection 200 can include a wireless connection.

Figure 6:
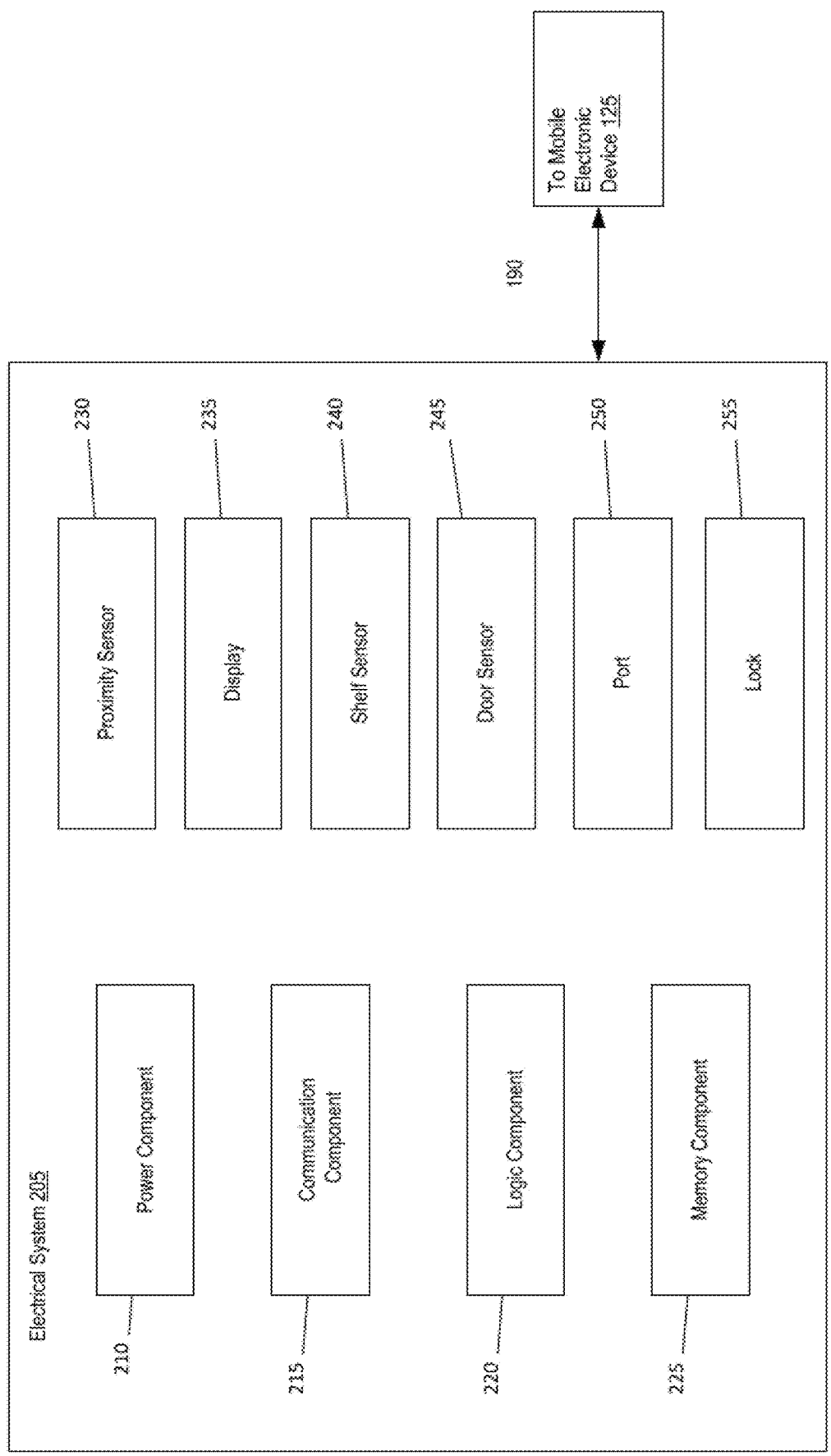
FIG. 6 is a block diagram representing a portion of the electrical components of the storage and charging station capable of being used in the system of FIG. 5.

With reference to FIG. 6, a portion of an electrical system 205 of a storage and charging station is schematically shown. Specifically, the example electrical system 205 is representative for the storage and charging station 100C. The shown portion of the electrical system 205 includes a power component 210, a communication component 215, a logic component 220, and a memory component 225. While the components 210-225 are shown as being distinct, it should be understood that one or more of the components 210-225 can be integrated. For example, the power component 210 and the communication component 215 can be part of a single component (or circuit) for promoting power and communication over direct connection 190 (discussed further below). As another example, the logic component 220 and the memory component 225 can be part of a single microcontroller. It is also envisioned, that one or more components 210-225 can include a plurality of similar components. For example, one power component 210 may power four mobile electronic devices 125, and consequently a sixteen-shelf storage and charging station 100 may include four power components 210.

The power component 210 and the communication component 215 are coupled to a port (discussed below) and can provide power and communication as described above. For example, the power and communication components 210 and 215 can provide a suitable standard transmission type, such as, but not limited to, USB-B, USB-C, and other known transmission types that may transmit both power and data. Other existing and yet to be available data and power transmission protocols capable of being provided by the power and communication components 210 and 215 include, but are not limited to, USB, USB $1.x$-$4.x$, USB mini, USB micro, USB types A and B may be utilized.

The logic component 220 may comprise a standard logic hardware known to computer peripherals (such as, but not limited to, keyboard, mouse, flash drives, and the like). Suitable hardware to support the functions described herein should be understood to be incorporated into the description provided.

Memory component 225 may comprise suitable memory for performing the functions described herein. In various implementations, memory component 225 stores a station identifier (also referred to herein as a tower identifier) and a number of shelf identifiers (also referred to herein as storage-bay identifiers). In at least one implementation, the number of shelf (or storage-bay) identifiers correlates with the number of shelves (or storage-bays) provided in the storage and charging station 100, which may likewise correlate to the number of direct connections 190.

In at least one construction, the logic component 220 and the memory component 225 can be combined as a microcontroller, for example, including a processor and a memory. The processor can include a component or group of components that are configured to execute, implement, and/or perform any of the processes or functions described herein for the storage and charging station 100 or a form of instructions to carry out such processes or cause such processes to be performed. Other examples of suitable processors are discussed below in connection with the mobile electronic device 125. The memory can include volatile and/or non-volatile memory. Other examples of suitable memory are also discussed below in connection with the mobile electronic device 125. The memory can be a component of the processor, can be operatively connected to the processor for use thereby, or a combination of both. The memory includes modules having computer-readable instructions that, when executed by the logic component 220, cause the logic component 220 to perform the various functions disclosed for the module. While functions may be described herein for purposes of brevity, it is noted that the functions for the station 100 are performed by the logic component using the instructions stored on or included in the various modules. Some modules may be stored remotely and accessible by the logic component 220 using, for instance, various communication devices and protocols.

The electrical system further includes a proximity sensor 230, a display 235, a shelf sensor 240, a door sensor 245, a port 250, and a door lock 255. While each component 230-255 is shown as being a single component, it should be understood that one or more of the components 230-255 can include a plurality of similar components. For example, the port 250 and shelf sensor 240 in FIG. 6 are shown as a single port and single shelf sensor; however, typically each shelf portion 115 of the storage and charging station 100 will include a respective port and respective shelf senor. Similarly, the number of displays 235, door locks 255, and door sensors 245 will vary depending on the design of the storage and charging station 100.

The proximity sensor 230 is a sensor capable of detecting the presence of a nearby object, e.g., a potential user, without any physical contact. For example, as a user approaches the storage and charging station 100, the proximity sensor may sense the user and the station 100 may perform an operation in response to the user approaching the station 100. An example operation includes activating the display 235 (e.g., the shelf LEDs discussed below) in response to the user approaching the storage and charging station 100.

The display 235 includes any device, component, or arrangement or groups thereof that enable information/data to be presented to a user. For example, the shown display in FIGS. 1A-1C includes a plurality of colored LEDs corresponding to each storage bay 120 or shelf 115.

The shelf sensor 240 is a localized proximity sensor able to detect the presence of a nearby object, e.g., the mobile electronic device 125, without any physical contact. For example, the shelf sensor 240 can be used to identify whether a mobile electronic device 125 is within the associated storage bay 120. The door sensor 245 is one of many varieties of sensors (e.g., a reed switch sensor) that can detect the opening and/or closing of a door and provide an input or communication in response thereto. The door lock 255 can be one of many varieties of locks (e.g., a linear actuator-rod based lock) that can lock and unlock a door when the door is shut. The door lock 255 can be in response to a lock/unlock signal or control. The port 250 is a power and communication port configured to provide power and provide a communication interface between the charging and communication station 100 and the mobile electronic device 125.

For the construction shown in FIG. 6, the storage and charging station 100 has a station identifier (also referred to herein as a tower identifier TID) which comprises a unique identifier for the station 100. Each direct connection 190 (which may include a port 250 and a conductor or cable 160) may have an identifier. The identifiers may be understood as individual identifiers of a particular storage bay 120 or shelf 235 within the storage and charging station 100. The identifiers may be referred to as shelf identifiers or storage bay identifiers SID. The shelf identifiers SIDs as well as the tower identifier TID may be stored in the memory component 225.

Before proceeding further, it should be understood that "tower" identifier TID and "shelf" identifier SID (and later "mobile device" identifier MDID) are terms used herein with the example construction shown and described in detail. The adjectives "tower" and "shelf" are example adjectives, and one skilled in the art would understand that different adjectives could be used. For example, "first" and "second" could be used in alternative to "tower" and "shelf." As another example, "station" and "port" could have been used in alternative to "tower" and "shelf". Countless other variations are possible.

The storage and charging station 100 may be connected to a first mobile electronic device 125 by way of a direct connection 190 (e.g., port 250 and cable 160). Again, while one mobile electronic device 125 is shown, several should be understood as contemplated within the scope of this disclosure (for example, a device for each shelf of the tower). The mobile electronic device 125 may have a receiving port, noted as USB-C(though again, variations on such a port should be contemplated as within the scope of this disclosure as described above). The logic component 220 of the storage and charging station 100 may provide instructions for transmittal of tower identifier TID1 and shelf identifier SID 1 from memory component 225 through the port 250 using cable 160 to the receiving port of the mobile electronic device 125

The mobile electronic device 125 may further comprise a device identifier MDID, which may be understood as a unique identifier of the device. Once the tower identifier TID and the shelf identifier SID are received by mobile electronic device 125, the network interface component (such as a network interface card NIC) as well as other hardware components of the mobile electronic device 125 (such as, but not limited to, processor and storage components provided therein) can pass the shelf identifier SID, the tower identifier TID, and the mobile electronic device identifier MDID to the server 170. The server 170 can host a tool or portal for identifying the location (shelf, storage device) of the mobile electronic device 125. As a non-limiting example, the server 170 may further comprise additional data logging for the storage and charging station 100, such as discussed herein.

In various implementations, connection of a computing device (for example, mobile electronic device 125) may allow for a response from the storage and charging station 100. For example, response hardware may comprise a computing device indicator such as an LED (for example, but not limited to, showing a color for charge status such as green for charged or red for uncharged), or a tonal indicator, or connection indicator. The response hardware may provide indicators on each shelf.

The logic component 220 may then allow for transmittal of the identifiers from the memory component 225 to the mobile electronic device 125 by way of the power and communication components and by way of, for example, the direct connection 190. Further operations are described below.

Figure 7:
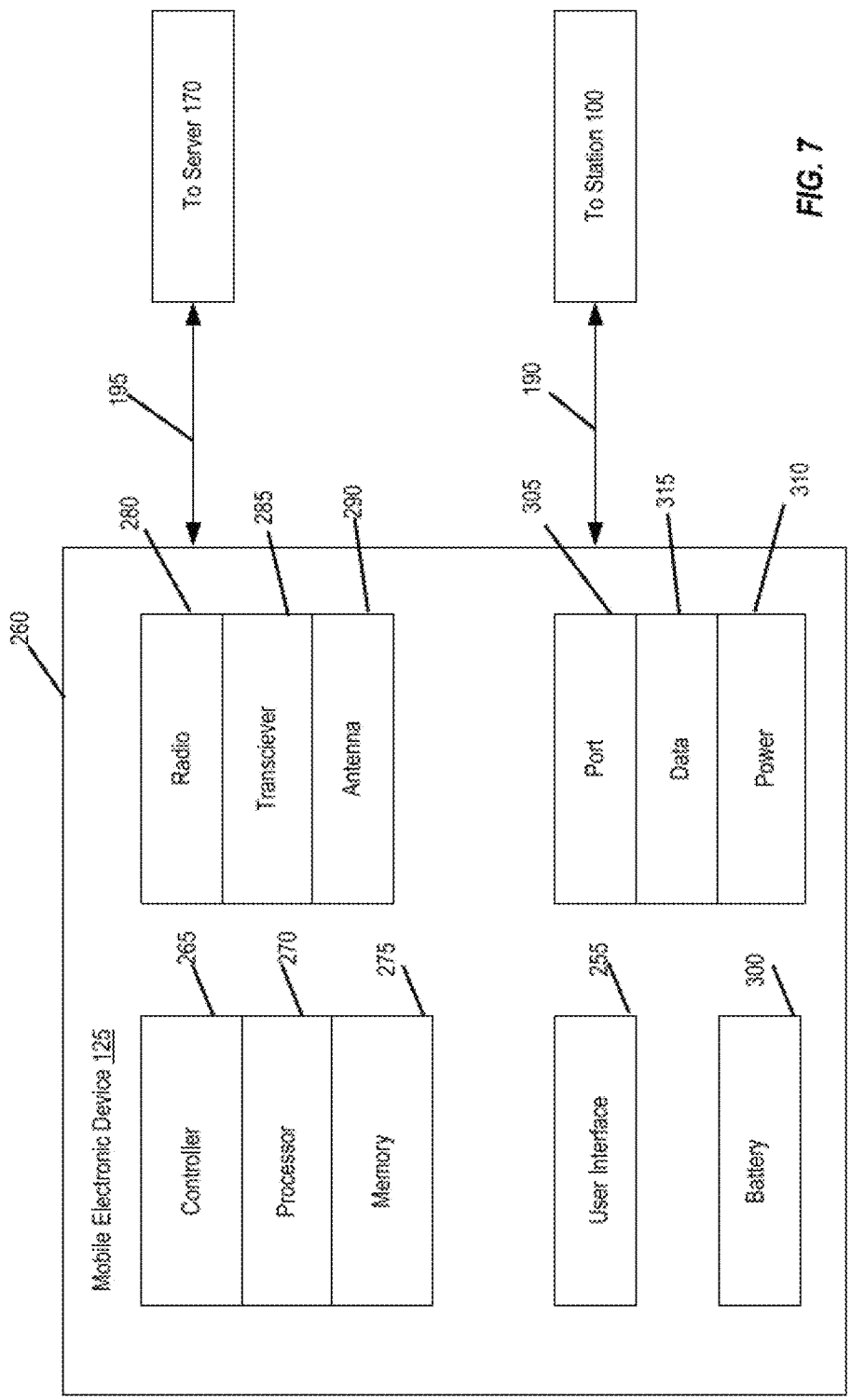
FIG. 7 is a block diagram representing a portion of a mobile electronic device capable of being used in the system of FIG. 5.

Turning now to FIG. 7, the Figure schematically represents a portion of the mobile electronic device 125 shown in FIG. 5. As previously discussed, the mobile electronic device 125 can be a hand-held electronic (or computing) device such as a laptop computer, a netbook computer, a notebook computer, a Google Chromebook™ computer, a tablet device (such as an Apple iPad®, Samsung Galaxy®, or Microsoft Surface®, or any similar known or future developed tablet), a mobile smartphone, or any other known or future developed mobile electronic device. In the illustration of FIG. 7, the mobile electronic device 125 has a housing 260 for enclosing and protecting the various components illustrated as blocks in FIG. 7. The mobile electronic device 125 has a controller 265, including a processor 270 and a memory 275. While the arrangement of FIG. 7 shows a single controller 265, processor 270, and memory 275, it is envisioned that many other arrangements are possible.

The processor 270 can include a component or group of components that are configured to execute, implement, and/or perform any of the processes or functions described herein for the mobile electronic device 125 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 270 can include a hardware circuit (e.g., an integrated circuit) configured to carry out instructions contained in program code. In arrangements in which there are a plurality of processors, such processors can work independently from each other or one or more processors can work in combination with each other.

The mobile electronic device 125 includes a memory 275 for storing one or more types of instructions and/or data. The memory 275 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 275 can be a component of the processor 270, can be operatively connected to the processor 270 for use thereby, or a combination of both.

In one or more arrangements, the memory 275 can include various instructions stored thereon. For example, the memory 275 can store one or more modules. Modules can be or include computer-readable instructions that, when executed by the processor 270, cause the processor 270 to perform the various functions disclosed for the module. While functions may be described herein for purposes of brevity, it is noted that the functions for the mobile electronic device 125 are performed by the processor 270 using the instructions stored on or included in the various modules. Some modules may be stored remotely and accessible by the processor 270 using, for instance, various communication devices and protocols.

Before moving to other components of the mobile electronic device 125, it should be understood by somebody skilled in the art that the controller 265 includes many additional conventional elements typically found in a mobile electronic device 125. Further discussion regarding these components is not provided herein since the components are conventional and their operation are conventional.

The mobile electronic device 125 communicates wirelessly (e.g., with the sever 170) via a radio 280. An example of a radio 280 includes a wireless local area network (WLAN) radio and/or a cellular radio. With a WLAN radio, the mobile electronic device 125 generally communicates over a short-range wireless communication network. With a cellular radio, the mobile electronic device 125 generally communicates over a cellular communication network (e.g., 4G, LTE, 5G, etc.). In one implementation, the radio 280 includes a transceiver 285 for transmitting and receiving signals to and from the mobile electronic device 125 via an antenna 290. The transceiver 275 can be separate to or part of the controller 265. The wireless communication can be as prescribed by the IEEE 802.11 standards in accordance with the Wi-Fi™ communication protocol. It is appreciated, however, that the mobile electronic device 125 can be adapted to perform communications in accordance with other known or to be developed communication protocols, or even a proprietary communication protocol developed for a particular application. Also, while only a single transceiver 285 and single antenna 290 is shown, multiple transceivers and multiple antennas can be used to communicate at multiple communication frequency bands.

The mobile electronic device 125 includes a user interface 295. The user interface 295 can include an input apparatus and an output apparatus. The input apparatus includes a device, component, system, element, or arrangement or groups thereof that enable information/data to be entered into the mobile electronic device 125 from a user. The output apparatus includes any device, component, or arrangement or groups thereof that enable information/data to be presented to the user. The input apparatus and the output apparatus can be combined as a single apparatus, such as a touch screen commonly used by many mobile electronic devices.

The mobile electronic device 125 includes a limited power source (e.g., a battery 300) and a power/communication port 305. The power communication port 305 is configured to receive power and provide a communication interface between the mobile electronic device 125 and another device, such as the charging and communication station 100. The mobile electronic device further includes a power component 310 and a communication component 315, which can be part of a single component (or circuit) in connection with the port 305. The power component 310 and the communication component 315 promote power and communication over direct connection 190. The power and communication components 310 and 315 may be comprised of a suitable standard transmission type, such as, but not limited to, USB, USB-C, and other known transmission types that may transmit both power and data. As shown, port 305 (which may transmit both data and power) may be a USB-C port.

Figure 8:
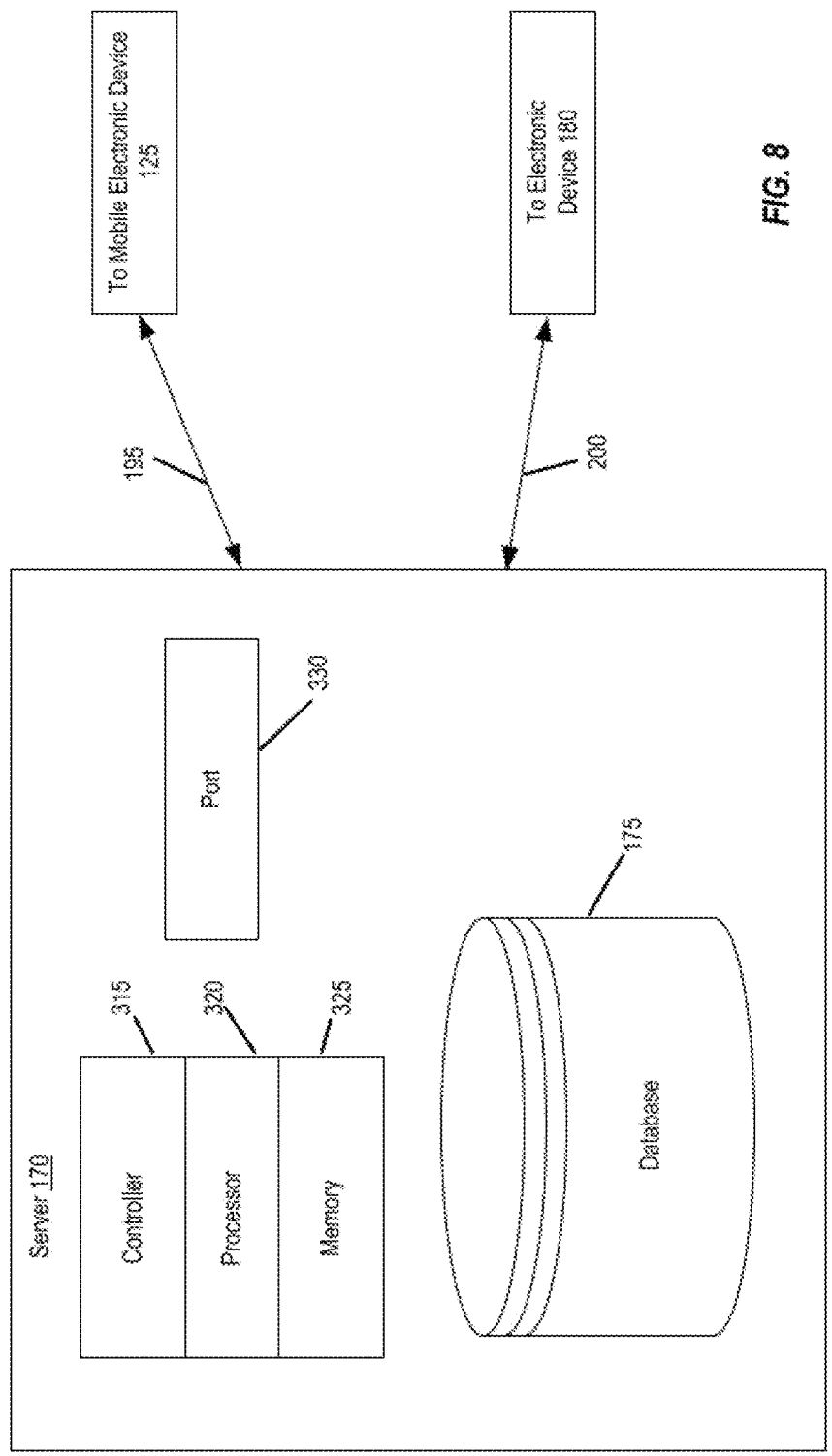
FIG. 8 is a block diagram representing a portion of a server capable of being used in the system of FIG. 5.

Before moving to FIG. 8, it should be well understood by somebody skilled in the art that the mobile electronic device 125 includes many additional conventional components typically found in a mobile electronic device 125. Further discussion regarding these components is not provided herein since the components are conventional and their operation are conventional.

Referring now to FIG. 8, the Figure schematically represents a portion of the server 170 and the database 175 shown in FIG. 5. In the illustration of FIG. 8, the server 175 has a controller 315, including a processor 320 and a memory 325, a database 175 and a communication port 330 for communicating with the other devices of the system 165.

The processor 320 can include a component or group of components that are configured to execute, implement, and/or perform any of the processes or functions described herein for the server 170, including the database 175, or a form of instructions to carry out such processes or cause such processes to be performed. Examples of suitable processors are discussed above in connection with the mobile electronic device 125. The memory can include volatile and/or non-volatile memory. Examples of suitable memories are also discussed above in connection with the mobile electronic device 125. The memory can be a component of the processor, can be operatively connected to the processor for use thereby, or a combination of both. The memory includes modules having computer-readable instructions that, when executed by the processor 320, cause the processor to perform the various functions disclosed for the module. While functions may be described herein for purposes of brevity, it is noted that the functions for the server 170 and database 175 are performed by the logic/memory components using the instructions stored on or included in the various modules.

With continued reference to the FIG. 8, the server 170 includes the database 175. The database 175 is, in one implementation, an electronic data structure stored in the memory or another data store and that is configured with routines that can be executed by a processor for recording (or storing) data, analyzing stored data, providing stored data, organizing stored data, and so on. Thus, in one embodiment, the database 175 stores data used by the server 170, and more broadly the system 165, in executing various functions.

Figure 9:
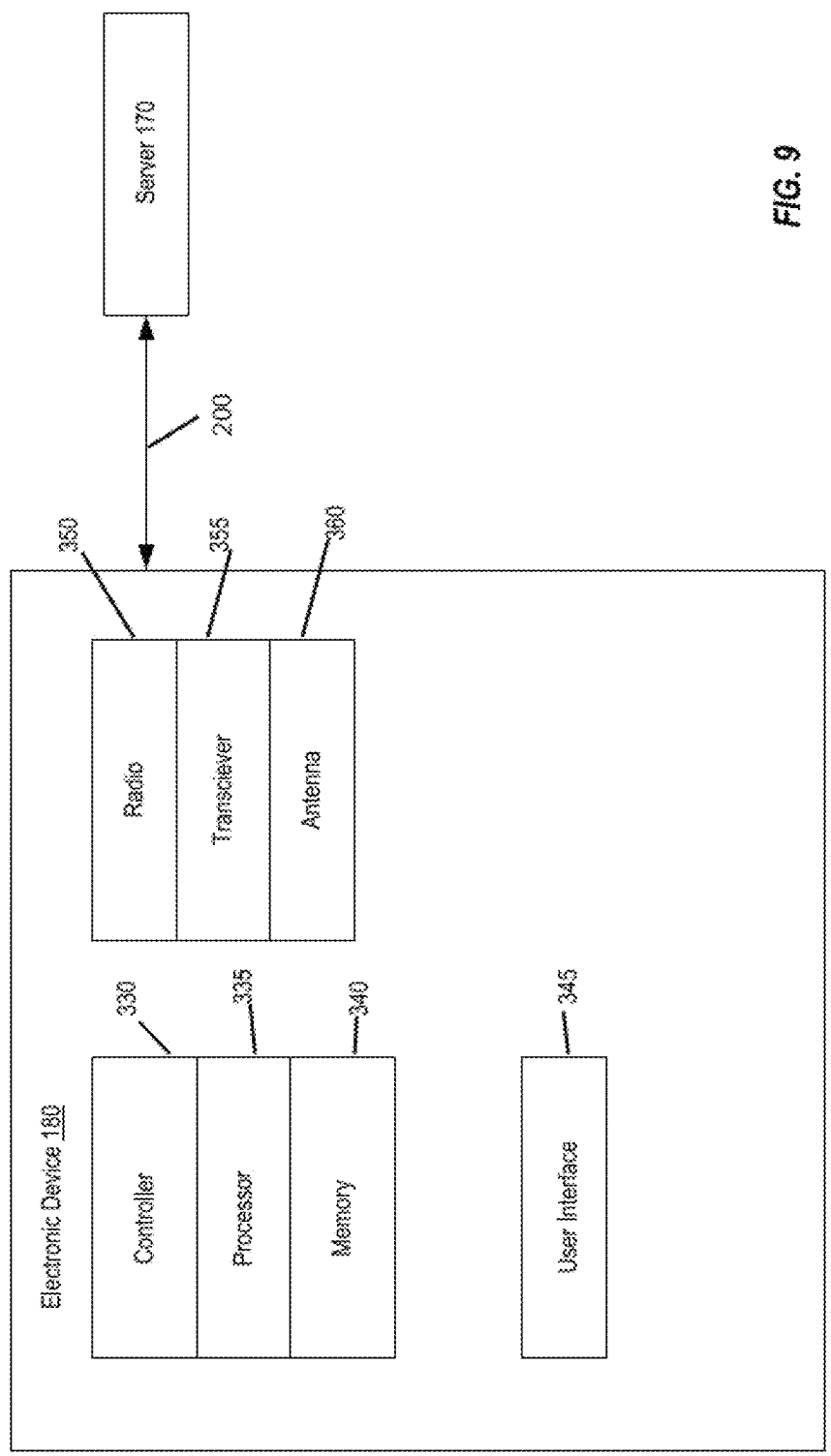
FIG. 9 is a block diagram representing a portion of an electronic device capable of being used in the system of FIG. 5.

Before moving to FIG. 9, it should be well understood by somebody skilled in the art that the server 170 and database 175 includes many additional conventional components typically found in a server 170 and database 175. Further discussion regarding these components is not provided herein since the components are conventional and their operation are conventional.

With reference to FIG. 9, the Figure schematically represents a portion of the electronic device 180, shown in FIG. 5, executing an application (or app) 185. The electronic device 180 can be a mobile electronic device, similar to the mobile electronic device 125, or a stationary electronic device, such as a desktop computer.

The electronic device 180 has a controller 330, including a processor 335 and a memory 340. While the arrangement of FIG. 9 shows a single controller 330, processor 335, and memory 340, it is envisioned that many other arrangements are possible.

The processor 335 can include a component or group of components that are configured to execute, implement, and/or perform any of the processes or functions described herein for the electronic device 180, or a form of instructions to carry out such processes or cause such processes to be performed. Examples of suitable processors are discussed above in connection with the mobile electronic device 180. The memory can include volatile and/or non-volatile memory. Examples of suitable memories are also discussed above in connection with the mobile electronic device 125. The memory can be a component of the processor, can be operatively connected to the processor for use thereby, or a combination of both. The memory includes modules having computer-readable instructions that, when executed by the processor 335, cause the processor to perform the various functions disclosed for the module. While functions may be described herein for purposes of brevity, it is noted that the functions for the electronic device 180 are performed by the logic/memory components using the instructions stored on or included in the various modules.

Before moving to other components of the mobile electronic device 125, it should be understood by somebody skilled in the art that the controller 330 includes many additional conventional elements typically found in a mobile electronic device 125. Further discussion regarding these components is not provided herein since the components are conventional.

The electronic device 180 includes a user interface 345. The user interface 345 can include an input apparatus and an output apparatus. The input apparatus includes a device, component, system, element, or arrangement or groups thereof that enable information/data to be entered into the mobile electronic device 180 from a user. The output apparatus includes any device, component, or arrangement or groups thereof that enable information/data to be presented to the user. The input apparatus and the output apparatus can be combined as a single apparatus, such as a touch screen commonly used by many mobile electronic devices.

The electronic device 180 communicates wirelessly (e.g., with the sever 170) via a radio 350. An example of a radio 280 includes a cellular radio, which allows the mobile electronic device 180 to generally communicate over a cellular communication network. In one implementation, the radio 350 includes a transceiver 355 for transmitting and receiving signals to and from the electronic device 180, via an antenna 360. The transceiver 355 can be separate to or part of the controller 330. Other radios, e.g., a Wi-Fi radio, can be included with the electronic device 180.

The electronic device 180 executes an application (or app), which is stored in memory 340. An application or app includes, but is not limited to, a software application. Generally, apps are available through app stores such as Apple's iTunes®, Google's Play Store®, Microsoft's App Store™, Blackberry®, and so forth. Apps are usually run on mobile-based operating systems running on iPhones®, iPads®, Android® Phones, Android® Tablets, Apple TV®, Google TV®, and many other similar devices, but can also be run on other operating systems, such as an operating system for a desktop computer. Operations related to the app are provided below. The descriptions of the operations relate to their functionality are in terms of the app. This is intended to mean that the app 185 is stored in the memory 340 and includes processor-executable instructions that, when executed on the processor 335, cause the processor 335 to perform the functionality described (in combination with other portions of the memory 340, as well as various hardware components of the electronic device 180 (such as the user interface 345 or the radio 350, for example)).

Figure 10:
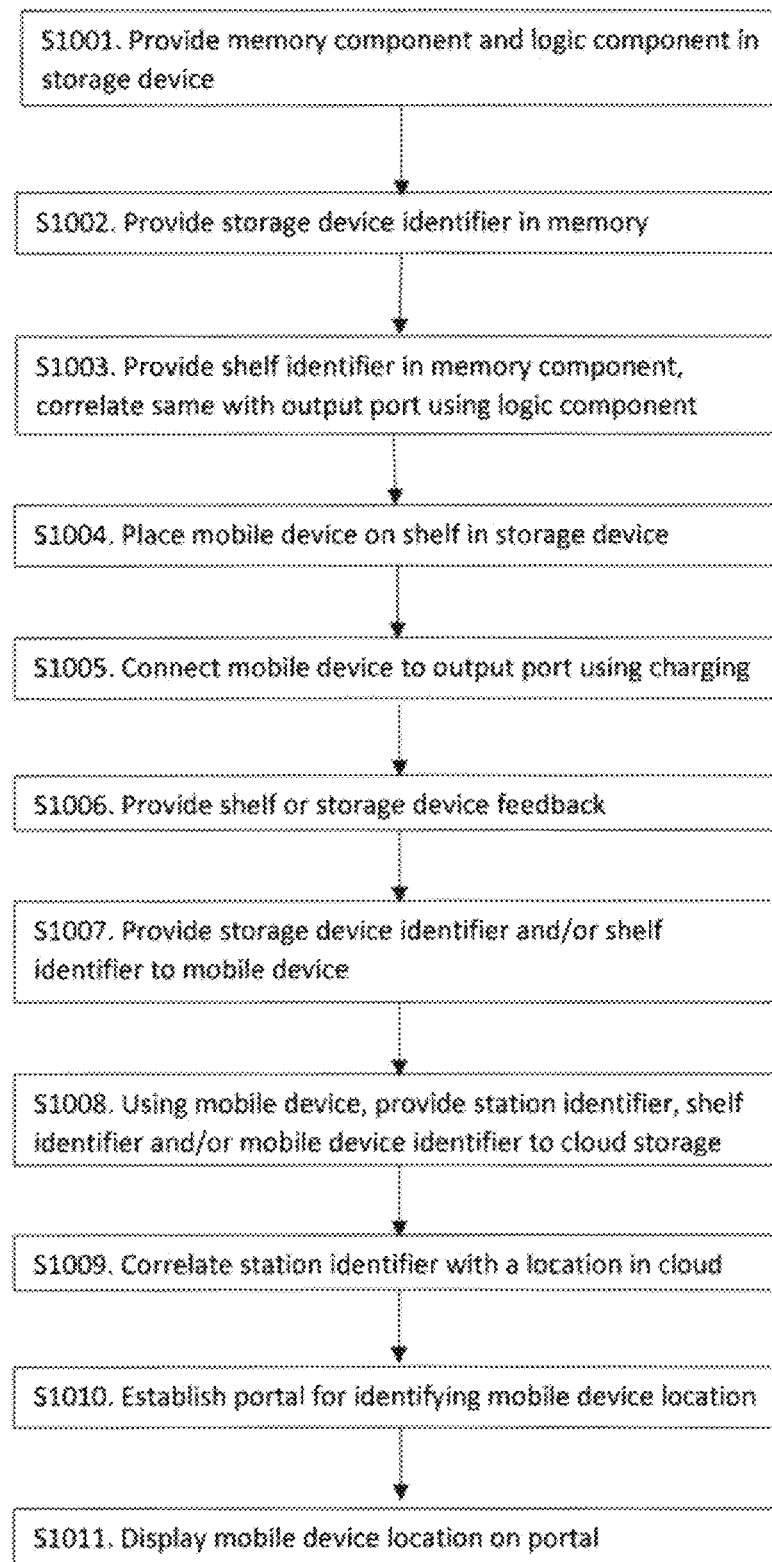
FIG. 10 is a flow diagram of a process for use with the system of FIG. 5.

Before proceeding to FIG. 10, it should be well understood by somebody skilled in the art that the electronic device 180 includes many additional conventional components typically found in an electronic device. Further discussion regarding these components is not provided herein since the components are conventional and their operation are conventional.

FIG. 10 shows an example workflow for the system 165 of FIG. 5. First, in step S1001, a memory component 225 and logic component 220 are provided in the station 100. A storage system identifier TID is provided in step S1002 in the memory component 225. The storage system identifier TID providing a unique identifier for reference. Next, in step S1003, shelf identifiers SIDs are provided in the memory component 225, which is correlated with an output (such as, but not limited to, a type of both power and data output such as USB) such that each power output is correlated with a shelf using the logic component 220. Next, in step S1004, a mobile electronic device 125 is placed on a storage bay 120 in the station 100. The mobile electronic device 125 is then in step S1005 connected to the station 100 using a charging cable 160. Data is transmitted from the station 100 to the mobile electronic device 125 and vice versa. For example, in step S1006 a shelf or storage device feedback (such as charging connection status, mobile device battery status, etc.) is provided. A station identifier TID and/or shelf identifier SID are then provided to the mobile electronic device 125 in step S1007 (though these steps may occur essentially simultaneously). The mobile electronic device 125 in step S1008 then provides the station identifier TID, shelf identifier SID, and/or mobile device identifier MDID to the server 170. The information is then consumed or otherwise established in the portal (e.g., the app 185 of the electronic device 180) for identifying the mobile electronic device location in step S1009. In various embodiments, further details regarding station location may be provided in the portal. As a non-limiting example, a station identifier TID may be logged by a user with a location, for example, using an interface 345. Finally, a mobile electronic device location may be displayed for a user accessing that information on the portal in step S1011.

Figure 11:
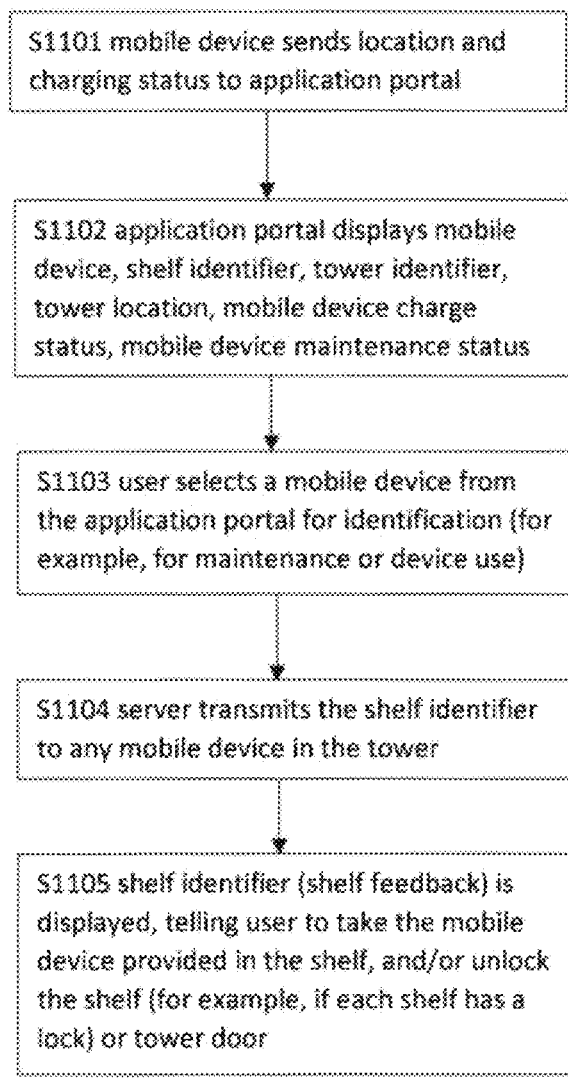
FIG. 11 is a flow diagram of a process for use with the system of FIG. 5.

FIG. 11 shows another workflow for the system 165 of FIG. 5. This time, the workflow begins at the server 170 using an application provided on the server 170. Then the information is transmitted through the mobile electronic device 125 to the station 100 for a response indication.

In step S1101, as described above, a mobile electronic device 125 sends various information to the server 170, including a station identifier TID (which may then be correlated with station location provided on the server 170) as well as its own device identifier MDID. Further information can be provided by the mobile electronic device 125 to the server 170, including for example, charging status and device maintenance status. In various embodiments, a device maintenance status may be provided on the server 170 (for example in the software or portal) by a user input. The application portal (for example, provided on the server or distributed remotely) may in step S1102 display a number of pieces of information, including but not limited to: identifying the mobile electronic device 125, its location on a shelf (such as a SID) and in a station 100, the station location, a mobile electronic device charge status, and a mobile electronic device maintenance status. It may be understood this information may be displayed for any number of electronic devices 180.

In step S1103, a user of the portal or application may select a mobile electronic device 125 for identification. This may occur, for example, when a user wants to check out a mobile electronic device 125 device for use, perform maintenance on a mobile electronic device 125, or otherwise indicate a mobile electronic device 125 to be retrieved from a tower, in various embodiments (other use cases should be contemplated as within the scope of this disclosure). The mobile electronic device 125, again, may be understood to be correlated with a shelf identifier SID and/or station 100 and location. Upon selection, in step S1104, the server 170 (by way of the portal or application) may transmit the selected mobile electronic device's location (for example, but not limited to, a shelf identifier SID) to the selected mobile electronic device 125 or, alternatively, to any mobile electronic device located in the tower. Transmission of the identifier to any mobile electronic device may have advantages where the selected mobile electronic device has limited connectivity (for example where maintenance needs to be performed on the mobile electronic device). The identifier may then be transmitted by a connected mobile electronic device 125 that has received the identifier from the server 170 to the station 100. In various embodiments, the transmission from the connected mobile device to the storage unit or tower may be made by way of the USB-C connection (again, this is a non-limiting example of connection type as described above). Once the station 100 receives the identifier (for example, the shelf identifier), in step S1105, the shelf feedback may be displayed. In various embodiments, the station 100 may trigger an indicator (for example, using its memory and logic components) to be displayed on the shelf correlated with the shelf identifier received from the server. In this way, the station 100 may indicate to a user which storage bay (and therefore mobile electronic device 125) is to be removed. It should be understood various responses by the station 100 may be made. As another non-limiting example, in various embodiments, the application may trigger the station 100 to unlock the shelf door (for example, if each shelf has a door) or station door. In these and other non-limiting examples, shelves and/or the station 100 would have limited access by one or more locking mechanisms, thereby limiting access to the device(s). In this way, the mobile application/portal 185 could trigger (again, by way of one or more mobile electronic devices) access to a mobile electronic device 125 or multiple devices. Further, an indicator light could be provided upon triggering the unlock mechanism to further guide a user to the appropriate mobile device.

FIGS. 12-24 represent workflows for various operations of the system 165 of FIG. 5. At the top of each figure of FIGS. 12-24 are the storage and charging station 100 (which is also be referred to as tower (T) in FIGS. 12-24), mobile electronic device 125 (which is also referred to as mobile device (MD) in FIGS. 12-24), server 170 including database 175 (which are collectively referred to as database (DB) in FIGS. 12-24), and electronic device 180 executing an application 185 (which are collectively referred to as app (A) in FIGS. 12-24). The tower (T) powers and communicates with the mobile device MD over the direct connection 190. The mobile device MD communicates with the database DB via a local area network (LAN) and/or a wide area network (WAN). The communication between the mobile device MD and the database DB includes the wireless connection 195. The database DB communicates with app A via a wide area network (WAN), such as the Internet, and/or a local area network (LAN). The communication between the database DB and the app A includes the connection 200.

Again, it should be understood for the detailed examples provided herein, that "tower," "shelf," "mobile device," "server," "app," and related terms are terminology used herein with the example constructions and processes shown and described in detail. One skilled in the art would appreciate that the terminology may vary for other charging and storage station designs.

Figure 12:
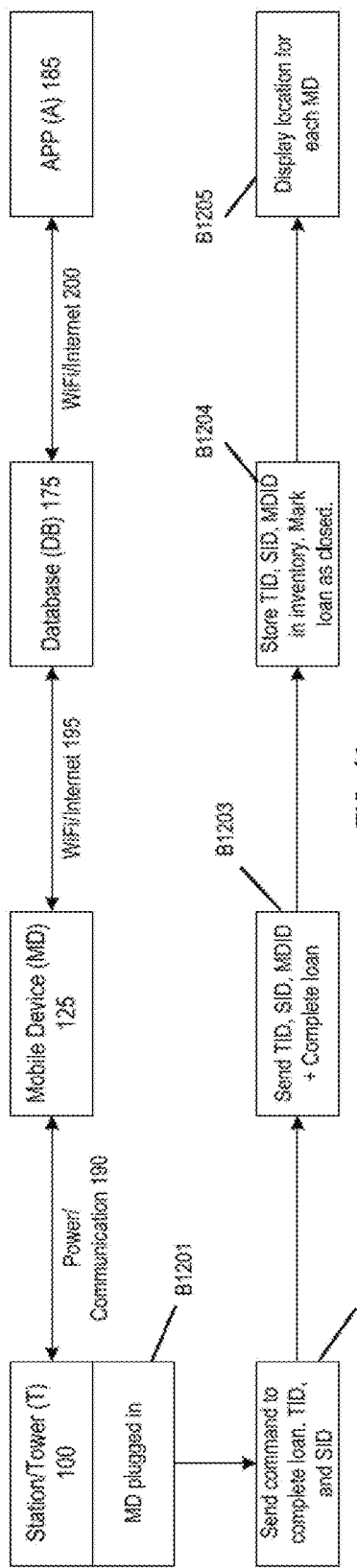
FIG. 12 is a flow diagram of a process for use with the system of FIG. 5 for locating inventory and logging a user out.

FIG. 12 shows a workflow for the system 165 of FIG. 5 for locating inventory and logging a user out. For example, FIG. 12 shows automatically logging out a user from a loaned mobile device and recording the return location of the device. In block B1201, a user connects (e.g., plugs) the mobile device MD to the tower T with the direct connection 190. The tower T sends (block B1202) a first communication over the direct connection with a command to complete the loan. The first communication further includes a tower identifier TID and shelf identifier SID. The mobile device MD sends (block B1203) a second communication to the database DB via the wireless connection 195. The second communication includes the tower identifier TID, shelf identifier SID, and mobile device identifier MDID, and the command to complete the loan for the mobile device MD. The database DB stores (block 1204) the tower identifier TID, shelf identifier SID, and mobile device identifier MDID. In addition, the database DB records the loan as closed. The database DB sends (block B1205) a third communication to the app A via the connection 200. The third communication includes location information for the mobile device MD. The location information can be displayed (block B1205) by the app A on the electronic device 180.

Upon receiving the checkout information, return information, or even lack of information, the server(s) and database(s) provide cloud-based computing to allow a technician, manager, user, information technology specialist, teacher, parent, etc. to manage the inventory of the station through the application. Further, through the use of the server(s) being in communication with multiple stations, one can manage a fleet of stations and/or an ecosystem of electronic devices. The use of location information of the station being communicated by the mobile electronic devices allows a greater monitoring and tracking system than with prior stand-alone charging stations. Further examples of management capabilities are provided by FIGS. 13-24 and below.

Figure 13:
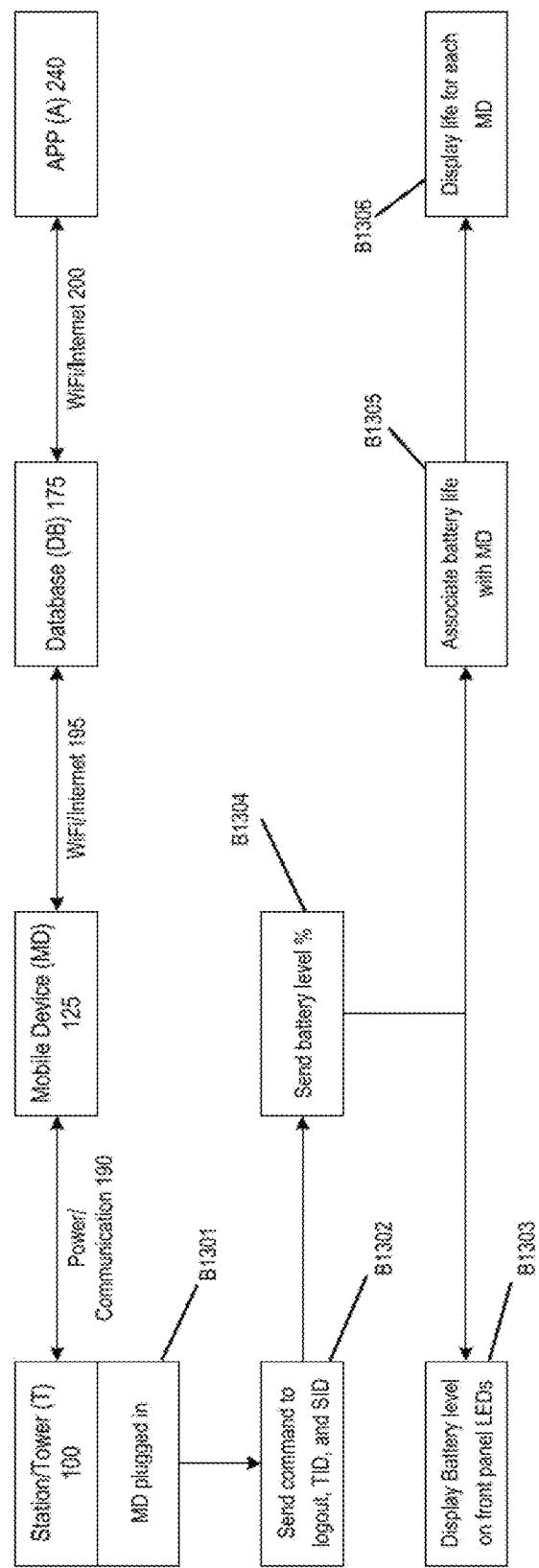
FIG. 13 is a flow diagram of a process for use with the system of FIG. 5 for indicating battery level.

FIG. 13 shows a workflow for the system 165 of FIG. 5 for indicating battery level. For example, FIG. 13 shows a battery charge level on the tower T and app A, and stores the battery charge level at database DB. In block B1301, a user connects (e.g., plugs) the mobile device MD to the tower T with the direct connection 190. The tower T sends (block B1302) a first communication over the direct connection with a command to logout (e.g., to complete the loan). The first communication further includes a tower identifier TID and shelf identifier SID. The mobile device MD determines and sends (block B1303) a second communication over the direct connection 190 and/or via the wireless connection 195. The second communication includes the battery information (e.g., battery level %) and can include the mobile device identifier MDID. With the battery information, the tower T can display (block B 1304) the battery information (e.g., battery level) via its display 235. Additionally, the database DB stores (block B1305) the battery information, including associating the battery information (e.g., battery like) with the mobile device identifier MDID. The database DB can also send a third communication to the app A via the connection 200. The third communication includes the battery information, along with other information such as the mobile device identifier MDID. The battery information can be displayed (block B1306) by the app A on the electronic device 180.

Figure 14:
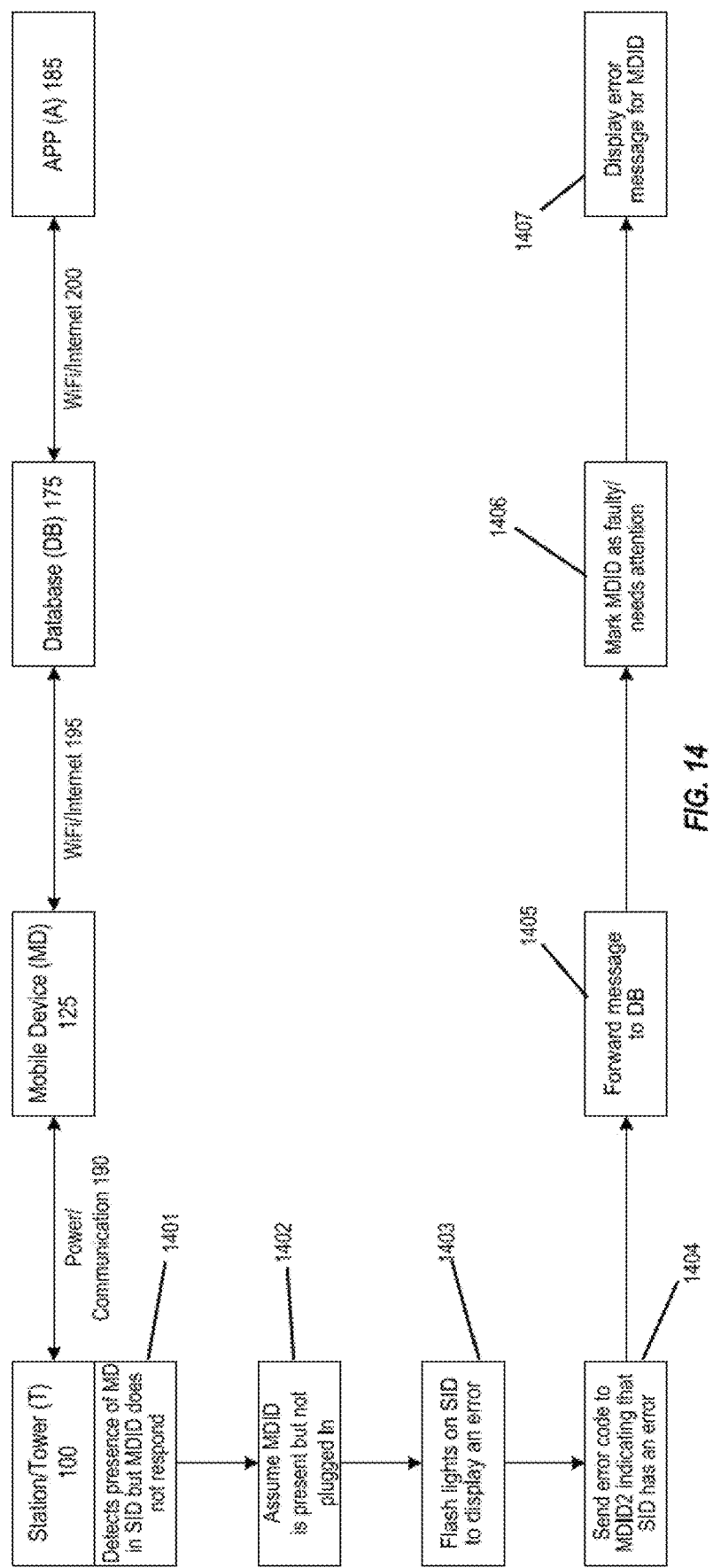
FIG. 14 is a flow diagram of a process for use with the system of FIG. 5 for detecting an unplugged mobile device.

FIG. 14 shows a workflow for the system 165 of FIG. 5 for detecting an unplugged mobile device MD. For example, FIG. 14 shows identifying that the mobile device is put away but not plugged, and the tower T communicates with the database DB and app A. In block B1401, the tower T detects the presence of a mobile MD at a shelf, but the mobile device MD does not respond. For example, the shelf can include a shelf proximity sensor 240 for sensing the placement of the mobile device MD. The tower T assumes (block B1402) the mobile device MD is present but not plugged in. The tower T informs its surroundings of the issue (e.g., via the display 235). For example, if the display 235 includes LEDs associated with each self, then the display flashes (block B1403) the LEDs corresponding to the shelf that has the issue. The tower T can also send (block B1404) a first communication over a direct connection 190 of another mobile device MD2 connected to the tower T to inform the database DB. The first communication can include a tower identifier TID and shelf identifier SID having the error. The mobile device MD2 sends (block B1405) a second communication (or forwards the first communication) to the database DB via the wireless connection 195. The second communication also includes the tower identifier TID and the shelf identifier SID having the error. The database DB records (block 1406) the tower identifier TID and the shelf identifier SID as faulty. The database DB sends (block B407) a third communication to the app A via the connection 200. The third communication identifies that the tower identifier TID and the shelf identifier SID have an issue and needs attention. The location information can be displayed (block B1407) by the app A on the electronic device 180.

Figure 15:
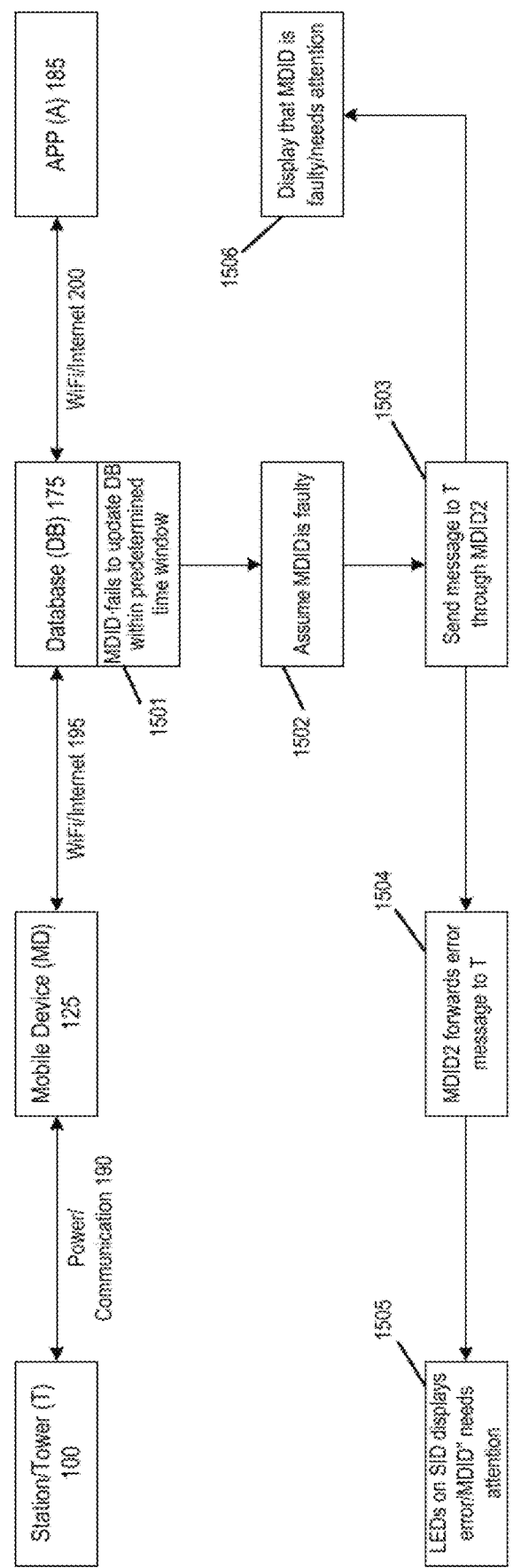
FIG. 15 is a flow diagram of a process for use with the system of FIG. 5 for lost communication.

FIG. 15 shows a workflow for the system 165 of FIG. 5 for lost communication. For example, FIG. 15 informs the loss of device communication at the tower T, database DB, and app A. In block 1501, the mobile device MD fails to update the database DB within a predetermined time window. The database DB assumes (block B1502) the mobile device MD has an error. The database DB sends (blocks 1503) communication to a second mobile device MD2 and the app A of the fault. The communication can include a mobile device identifier MID of the mobile device MD. The second mobile device MD2 forwards (1504) the error message to the tower T. The tower T informs its surroundings of the issue (e.g., via the display 235). For example, if the display includes LEDs associated with each shelf, then the display 235 flashes (block 1505) the LEDs corresponding to the shelf with the mobile device MD that has the issue. At block 1506, app A displays that mobile device MD has an issue and needs attention. To assist, the communication to the app A can further include the tower identifier TID and the shelf identifier SID with the mobile device MD having the issue.

Figures 16, 17:
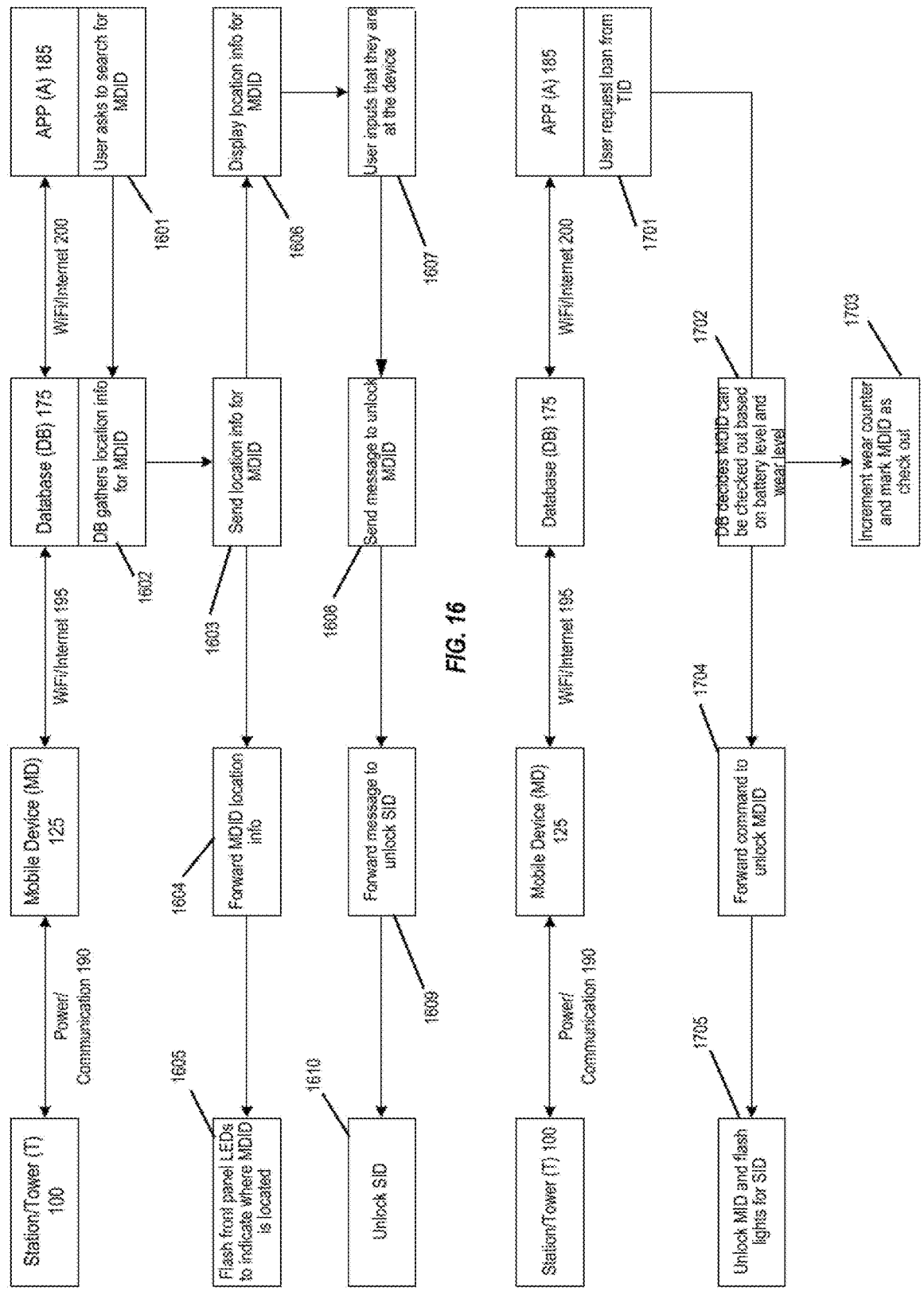
FIG. 16 is a flow diagram of a process for use with the system of FIG. 5 for locating a device.
FIG. 17 is a flow diagram of a process for use with the system of FIG. 5 for requesting a loan by a user while at a tower.

FIG. 16 shows a workflow for the system 165 of FIG. 5 for locating a mobile device MD. For example, in FIG. 16 an administrator can locate a specific mobile device MD using database DB or app A. The location can also be shown on tower T. At block B1601, a user (or IT person) asks to search for mobile device MD. The app A communicates the request to the database DB 175. The database gathers (block B1602) location info for mobile device MD. The location information can include a tower identifier TID and a shelf location SID. The database DB sends second communications (1603), including the location information, to the mobile device MD and the app A. The mobile device MD forwards (1604) the location information to the tower T. The tower T informs its surroundings of the location of the mobile device MD (e.g., via the display 235). For example, if the display 235 includes LEDs associated with each shelf, then the display flashes (block B1605) the LEDs corresponding to the shelf with the mobile device MD. At block B1606, app A displays that location information for the mobile device MD. Continuing the example in FIG. 16, at block B1607, the user enters that they are at the tower T, and that information is communicated to the database DB. The database DB sends (block B1608) a communication to the mobile device MD to unlock the tower/shelf associated with the mobile device MD. The communication can include the shelf identifier SID. The mobile device MD forwards (block B1609) the communication including the unlock command to the tower T. At block 1610, the tower unlocks the tower door, or the shelf door associated with the mobile device MD.

FIG. 17 shows a workflow for the system 165 of FIG. 5 for requesting a loan while at tower by a user. For example, the user can request a loan on the app A while at specific tower T. At block B1701, the user requests a loan mobile device while at the tower T. The app A communicates the request to the database DB 175. The database DB decides (block B1702) a mobile device MD that can be checked out. The determination can be based on battery level and wear level, for example. The database DB can increment (block B1703) a wear counter and mark the mobile device MD as checked out. The database DB communicates to the tower by sending a communication to the mobile device MD to unlock the tower/shelf associated with the mobile device MD. The communication can include the shelf identifier SID. The mobile device MD forwards (block 1705) the communication including the unlock command to the tower T. At block 1705, the tower T unlocks the tower door, or the shelf door associated with the mobile device MD. The tower T can also inform its surroundings of the shelf to be opened (e.g., via the display 235). For example, if the display 235 includes LEDs associated with each shelf, then the tower T flashes the LEDs corresponding to the shelf with the mobile device MD.

Figure 18:
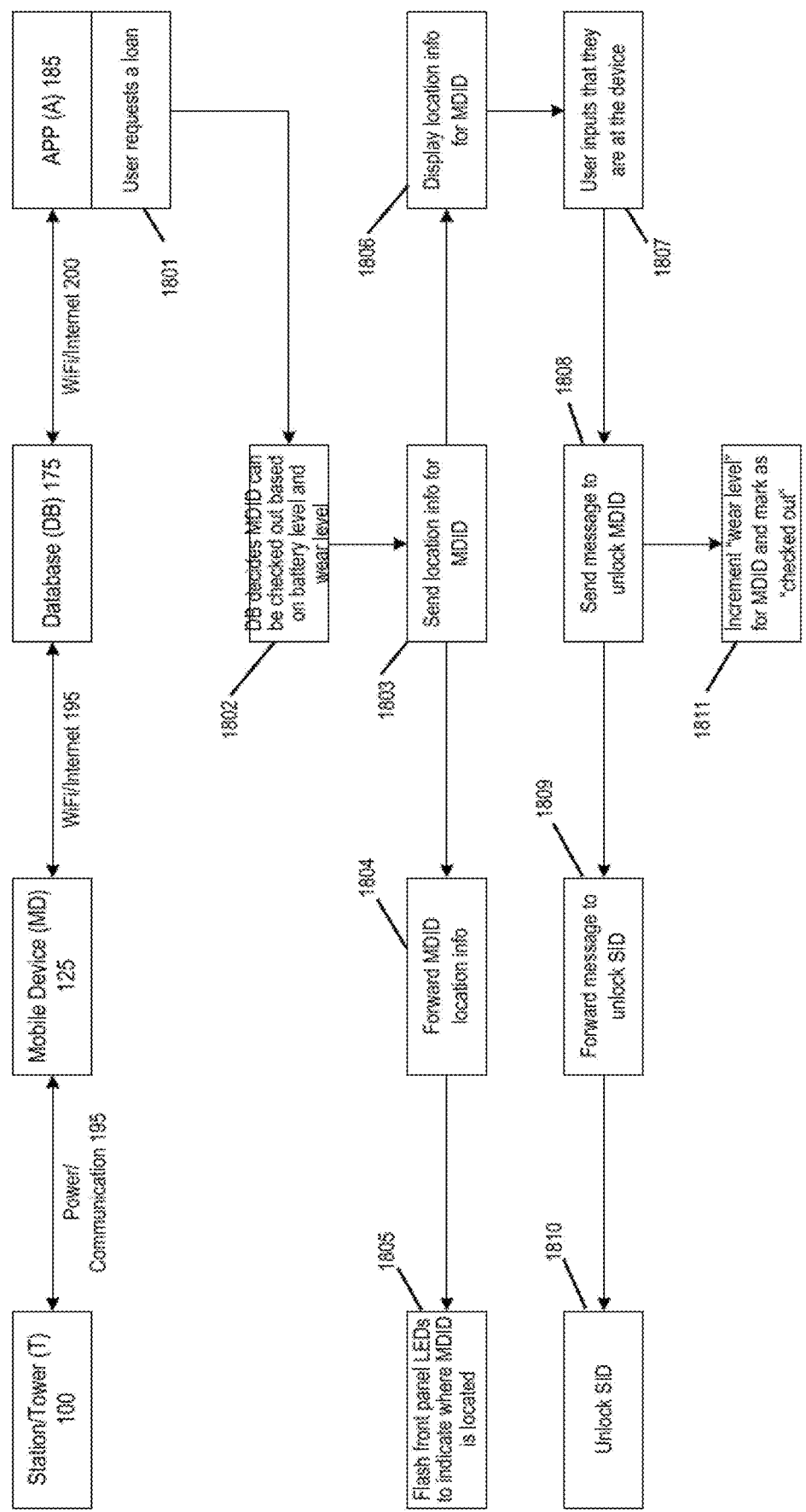
FIG. 18 is a flow diagram of a process for use with the system of FIG. 5 for requesting a loan by a user while not at a tower.

FIG. 18 shows a workflow for the system 165 of FIG. 5 for requesting a loan while not at tower by a user. For example, the user can request a "generic" loan of a mobile device. The app A can help direct the user to their nearby loan mobile device. At block B1801, the user requests a loan at the app A. The app A communicates the request to the database DB 175. The database DB decides (block B1802) a mobile device MD can be checked out based on battery level and wear level, for example. The database DB communicates (1803) to the tower T a communication to the mobile device MD to identify the tower/shelf associated with the mobile device MD. The communication can include the shelf identifier SID. The mobile device MD forwards (block 1804) the communication including the identification command to the tower T. The tower T informs its surroundings of the shelf to be opened (e.g., via the display 235). For example, if the display 235 includes LEDs associated with each shelf, then the tower T flashes (block 1805) the LEDs corresponding to the shelf with the mobile device MD. Returning to block 1803, the database DB also communicates to the app A the location information for the mobile device MD. At block B1806, app A displays that location information for the mobile device MD. At block B1807, the user enters that they are at the tower T, and that information is communicated to the database DB. The database DB sends (block B1808) a communication to the mobile device MD to unlock the tower/shelf associated with the mobile device MD. The communication can include the shelf identifier SID. The mobile device MD forwards (block B1809) the communication including the unlock command to the tower T. At block 1810, the tower T unlocks the tower door, or the shelf door associated with the mobile device MD. The database can also increment (block B1811) a "wear level" for the mobile device MD and mark as "checked out."

FIG. 19 shows a workflow for the system 165 of FIG. 5 for indicating an improper door closure. For example, the tower can indicate a door has remained open. At block B1901, the tower T detects a door is open with the door sensor 245. The tower T informs its surroundings of the shelf that is open (e.g., via the display 235). For example, if the display includes LEDs associated with each shelf, then the tower T flashes (block 1902) the LEDs corresponding to the shelf with the open door. If door is open for too long, the tower sends (block B1903) a message to database DB. The tower T can change the communication to its surrounding (e.g., changing yellow LEDs to red LEDS). The mobile device MD forwards (block 1904) the first communication to the database DB via the wireless connection 195. The database DB (block 1905) sends a communication to an operator or IT manager via the app A. The operator or IT manager can view (block 1906) "door open" message.

FIG. 20 shows a workflow for the system 165 of FIG. 5 for time locking a shelf door. For towers with individual shelf locks, checkouts may only be allowed during work hours. At block B2001, a user might attempt to check out a mobile device MD after work hours. The user can check out the mobile device via the app A. The app A communicates the request to the database DB. The database DB records (block B2002) that someone attempted to use the mobile device after hours. The database DB sends (block B2003) a message notifying the user that is currently outside working hours. The app A displays (block B2004) the message.

Figure 21:
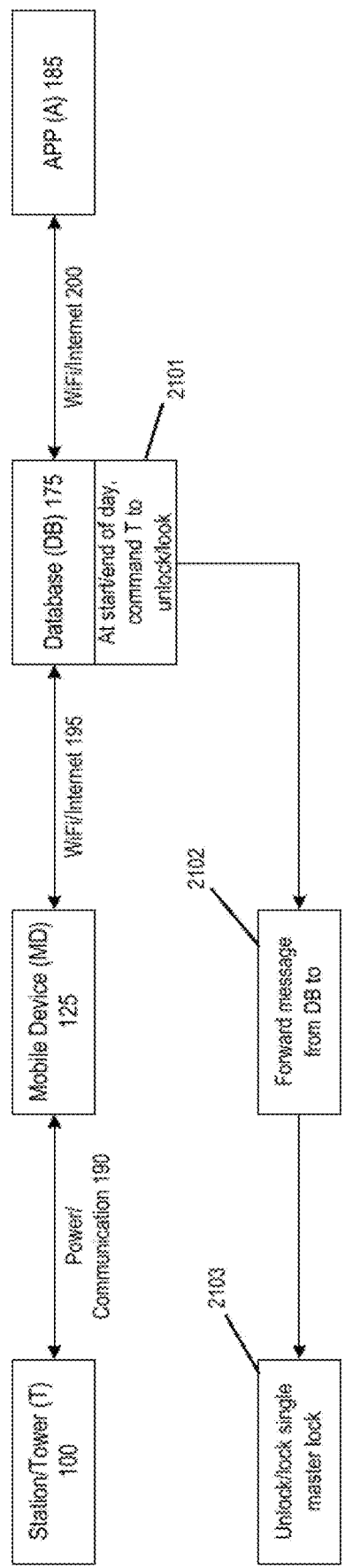
FIG. 21 is a flow diagram of a process for use with the system of FIG. 5 for time locking a single master door.

FIG. 21 shows a workflow for the system 165 of FIG. 5 for time locking a single master door. For towers with a single door lock, checkouts may only be allowed during working hours. At block B2101, at the start/end of the day, the database DB sends a communication to the mobile device MD to unlock or lock the door. The mobile device MD sends (block 2102) or forwards the communication to the tower T, which unlocks or locks (block 2103) the door.

Figure 22:
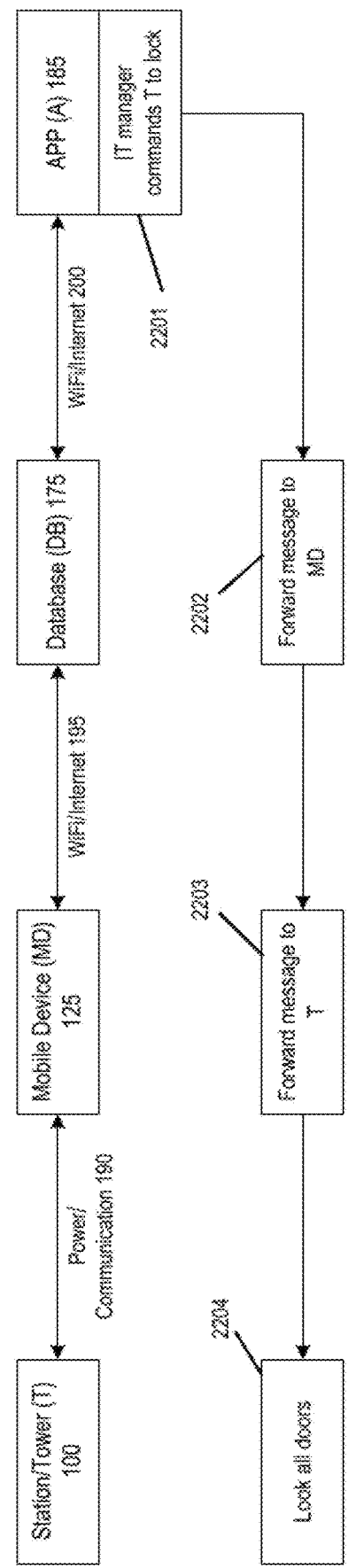
FIG. 22 is a flow diagram of a process for use with the system of FIG. 5 for locking down a device.

FIG. 22 shows a workflow for the system 165 of FIG. 5 for locking down a device. This procedure allows an administrator to force a tower identifier TID to lock the door(s) of the tower T. At block B2201, a user, e.g., an IT manager, uses the app A to command the tower T to lock. With the help of the database DB and the mobile device MD, a communication with the command is forwarded (blocks B2202 and B2203) to the tower T, which locks the door(s) (block B2204).

Figure 23:
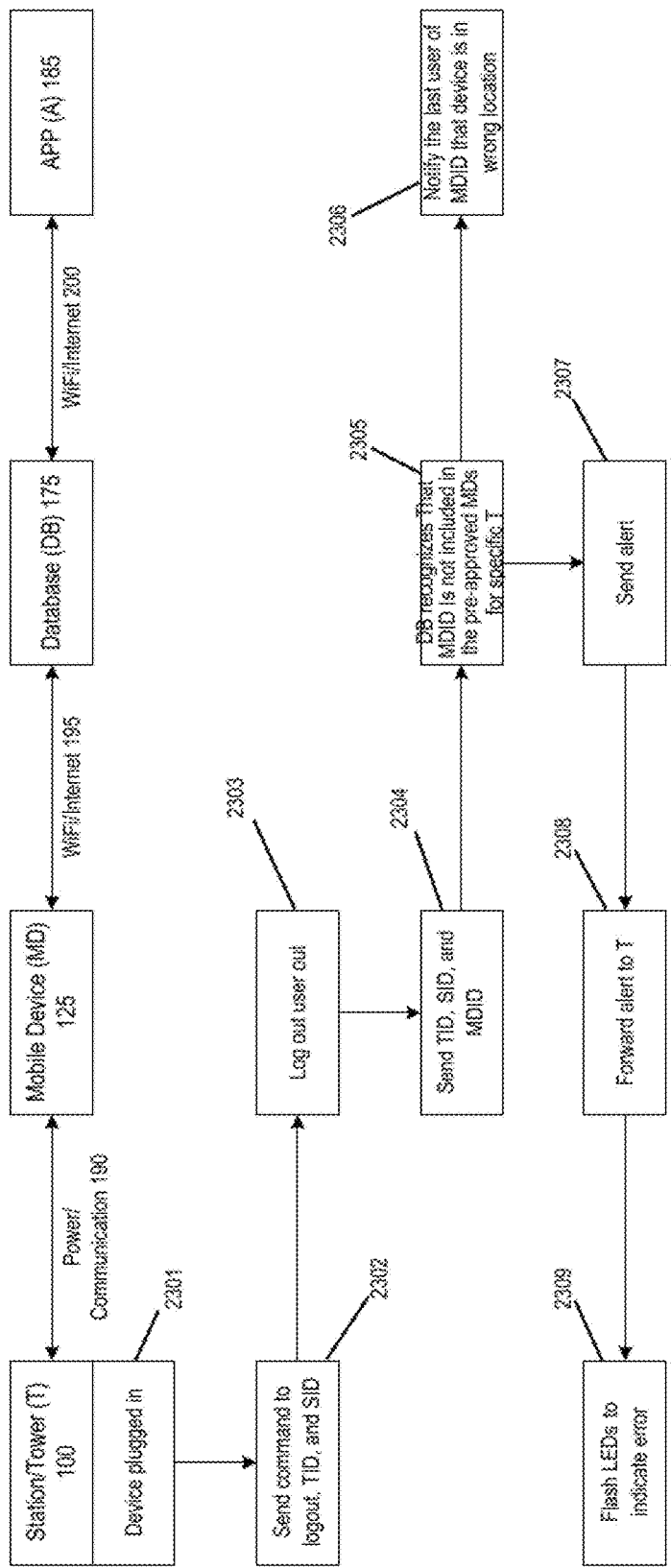
FIG. 23 is a flow diagram of a process for use with the system of FIG. 5 for detecting a non-homegroup device placed in the station.

FIG. 23 shows a workflow for the system 165 of FIG. 5 for detecting a non-homegroup device placed in the tower. If a non-authorized mobile device MD is placed in the incorrect tower T, the tower T can alert a user. At block B2301, the unauthorized mobile device MD is plugged in by a user. The tower T starts a log out process similar to FIG. 12, which includes blocks B2302, block B2303, and block B2304. At block B2305, the database DB recognizes that the mobile device's identifier MDID is not included in a pre-approved list of mobile devices for the specific tower T. The database DB sends (block B2306) a communication notifying the last user of the mobile device MD that the device is in the wrong location. Additionally, the database DB can send (block B2307) an alert communication to the tower T via the mobile device MD. The mobile device forwards (block B2307) the alert to the tower T, which can flash (block B2309) LEDs to indicate error.

Figure 24:
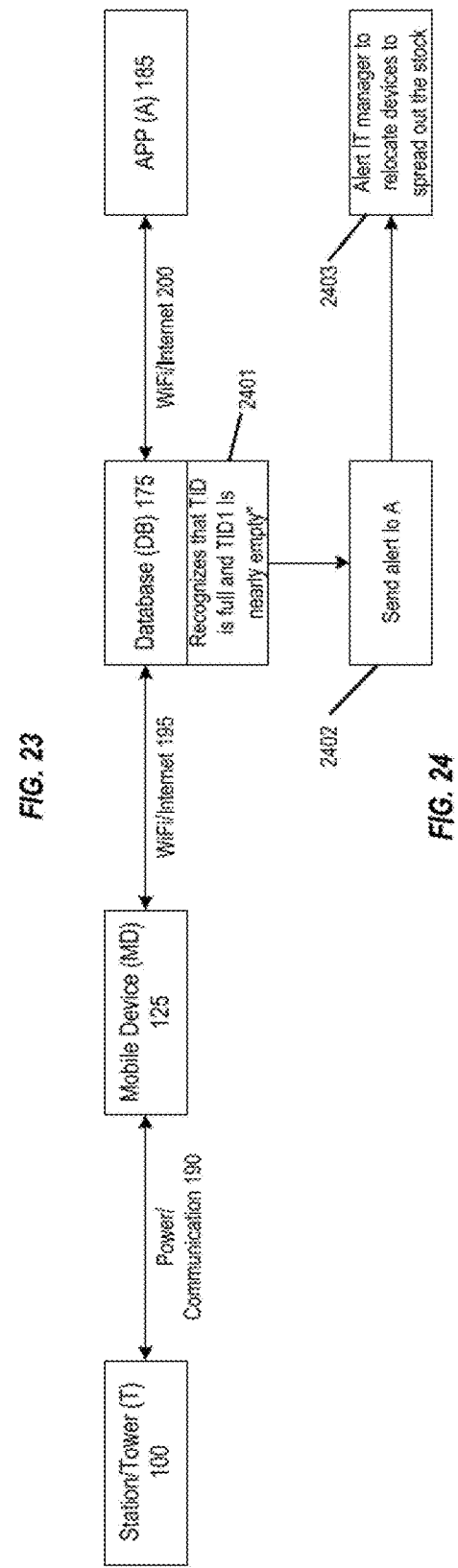
FIG. 24 is a flow diagram of a process for balancing device utilization.

FIG. 24 shows a workflow for the system 165 of FIG. 5 for balancing device utilization. The process of FIG. 24 allows an administrator to keep all towers T evenly filled. At block B2401, the database DB recognizes that the tower T is full and that a tower T2 is nearly empty. The database, in response, sends (block B2402) an alert to the app A. A user, such as an IT manager, is alerted (block B2403) by the app A to relocate devices to spread out the stock.

Accordingly, the disclosure provides a new and useful storage and charging station for storing and charging a plurality of mobile electronic devices. The disclosure also provides a new and useful method of and system for storing, inventorying, charging, deploying, tracking, and/or managing mobile electronic devices.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the invention. Also, various steps and operations can be performed concurrently. It is intended that all matter contained in the above description or shown in the accompanying drawings shall be interpreted as illustrative only and not limiting. Changes in detail or structure may be made without departing from the spirit of the invention as defined in the appended claims.

The system and methods described herein may be implemented in or by software (for example, to identify and display location information). To this end, the methods may be implemented in a general-purpose software package or a specific purpose software package.

As described herein, in one or more examples of embodiments, the system, method, and devices described, or method embodied by software, may be implemented by a computer (or electronic) system or in combination with a computer system. The computer system may be or include a processor. The computers for use with the methods and various components described herein may be programmable computers which may be special purpose computers or general-purpose computers that execute the system according to the relevant instructions.

The computer can also include a display, provision for data input and output, etc. Furthermore, the computer or computers may be operatively or functionally connected to one or more mass storage devices, such as, but not limited to, a database. The memory storage can be volatile or non-volatile and can include removable storage media. The system may also include computer-readable media which may include any computer readable media or medium that may be used to carry or store desired program code that may be accessed by a computer. The invention can also be embodied as computer readable code on a computer readable medium. To this end, the computer readable medium may be any data storage device that can store data which can be thereafter read by a computer system.

The systems and devices described may include physical hardware and firmware configurations, along with hardware, firmware, and software programming that can carry out the currently described methods.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements, and/or substantial equivalents. The technical effects and technical problems in the specification are exemplary and are not limiting. It should be noted that the embodiments described in the specification may have other technical effects and can solve other technical problems.

What is claimed is:

1. A method of operating a storage and charging station for storing and charging a plurality of mobile electronic devices and for communicating via at least one mobile electronic device of the plurality of mobile electronic devices, the storage and charging station comprising a storage assembly and an electrical system supported by the storage assembly, the storage assembly comprising a frame and a plurality of storage bays supported by the frame, the plurality of storage bays for receiving the plurality of mobile electronic devices, the electrical system comprising a memory component storing a station identifier and a plurality of storage bay identifiers, each one of the plurality of storage bay identifiers being associated with a respective storage bay, the method comprising:

receiving a first signal indicative of a first mobile electronic device being connected to a first charging port associated with a first storage bay of the plurality of storage bays;

the station, via the first charging port, powering the first mobile electronic device;

after receiving the first signal, the station, via the first charging port, communicating the station identifier and a first storage bay identifier associated with the first storage bay to the first mobile electronic device; and after the station identifier and the first storage bay identifier are received by the first mobile electronic device, causing the station identifier and the first storage bay identifier to be communicated from the first mobile electronic device to a remote electronic device.

2. The method of claim 1, and further comprising:

receiving a second signal indicative of a second mobile electronic device being connected to a second charging port associated with a second storage bay of the plurality of storage bays, the station, via the second charging port, powering the second mobile electronic device;

after receiving the second signal, the station, via the second charging port, communicating the station identifier and a second storage bay identifier associated with the second storage bay to the second mobile electronic device; and after the station identifier and the second storage bay identifier are received by the second mobile electronic device, causing the station identifier and the second storage bay identifier to be communicated from the second mobile electronic device to a remote electronic device.

3. The method of claim 1, and further comprising:
receiving a second signal indicative of a second mobile electronic device being connected to a second charging port associated with a second storage bay of the plurality of storage bays:
the station, via the second charging port, powering the second mobile electronic device;
after receiving the second signal, the station, via the first charging port, communicating the station identifier and a second storage bay identifier associated with the second storage bay to the first mobile electronic device; and
after the station. identifier and the second storage bay identifier are received by the first mobile electronic device, causing the station identifier and the second storage bay identifier to be communicated from the second mobile electronic device to a remote electronic device.

4. The method of claim 3, wherein causing the station identifier and the second storage bay identifier to be communicated from the first mobile electronic device to a remote electronic device indicates a fault communicating via the second mobile electronic device.

5. The method of claim 1, and further comprising:
determining a second mobile electronic device being associated with a second storage bay of the plurality of storage bays was placed in the second storage bay;
after the determination, the station, via the first charging pod., communicating the station identifier and a second storage bay identifier associated with the second storage bay to the first mobile electronic device; and
after the station identifier and the second storage bay identifier are received by the first mobile electronic device, causing the station identifier and the second storage bay identifier to be communicated from the second mobile electronic device to a remote electronic device.

6. The method of claim 5, wherein causing the station identifier and the second storage bay identifier to be communicated from the first mobile electronic device to a remote electronic device indicates a fault has occur between the second mobile electronic device and a second charging port.

7. The method of claim 1, wherein the remote electronic device comprises a server and a hand-held electronic device, and wherein the communication with the remote electronic device includes causing the station identifier, the storage bay identifier, and the mobile electronic device to be communicated to the remote electronic device via the server.

8. The method of claim 1, wherein causing the station identifier and the first storage bay identifier to be communicated from the first mobile electronic device to the remote electronic device indicates that first mobile electronic device has returned to the storage and charging station.

9. The method of claim 1. wherein the storage and charging station is one of a. plurality of networked available storage and charging stations.

10. The method of claim 1, and further comprising determining a battery level for the first mobile electronic device; and
causing the first mobile electronic device to communicate the battery level to the remote electronic device.

11. The method of claim 1, and further comprising:
receiving a request, via the first mobile electronic device, initiated from the remote electronic device;
processing the request at the station;
the station, via the first charging port, communicating a response to the first mobile electronic device; and
causing the response to be communicated from the first mobile electronic device to the remote electronic device.

12. The method of claim 11, wherein the request includes identifying a status of the plurality of storage bays.

13. The method of claim 11, wherein the request includes identifying a status of a plurality of mobile electronic devices at the station.

14. The method of claim 1, and further comprising:
receiving a communication, via the first mobile electronic device, initiated from the remote electronic device, the communication indicating the first mobile electronic device was placed in a wrong storage bay.

15. A storage and charging system comprising:
a storage and charging station for storing and charging a plurality of mobile electronic devices and for communicating via at least one mobile electronic device of the plurality of mobile electronic devices, the storage and charging station comprising:
a storage assembly comprising a frame and a plurality of storage bays supported by the frame, the plurality of storage bays for receiving the plurality of mobile electronic devices; and
an electrical system supported by the storage assembly, the electrical system comprising a memory component storing a station identifier and a plurality of storage bay identifiers, each one of the plurality of storage bay identifiers being associated with a respective storage bay; and
a remote electronic device remote from the storage and charging station and in communication with the storage and charging station,
wherein the storage and charging station is configured to:
receive a first signal indicative of a first mobile electronic device being connected to a first charging port associated with a first storage bay of the plurality of storage bays;
via the first charging port, power the first mobile electronic device;
after receiving the first signal, via the first charging port, communicate the station identifier and a first storage bay identifier associated with the first storage bay to the first mobile electronic device; and
after the station identifier and the first storage bay identifier are received by the first mobile electronic device, cause the station identifier and the first storage bay identifier to be communicated from the first mobile electronic device to a remote electronic device.

16. The system of claim 15, wherein the remote electronic device comprises a server.

17. The system of claim 15, and further comprising:
a second storage and charging station for storing and charging a second plurality of mobile electronic devices and for communicating via at least one second mobile electronic device of the second plurality of mobile electronic devices, the second storage and charging station comprising:

a second storage assembly comprising a second frame and a second plurality of storage bays supported by the second frame, the second plurality of storage bays for receiving the second plurality of mobile electronic devices; and a second electrical system supported by the second storage assembly, the second electrical system comprising a second memory component storing a second station identifier and a second plurality of storage bay identifiers, each one of the second plurality of storage bay identifiers being associated with a respective second storage bay.

18. The system of claim 17, wherein the plurality of mobile electronic devices includes at least one of the second plurality of mobile electronic devices.

\* \* \* \* \*